(12) United States Patent
Jones et al.

(10) Patent No.: US 6,415,307 B2
(45) Date of Patent: *Jul. 2, 2002

(54) PUBLICATION FILE CONVERSION AND DISPLAY

(75) Inventors: Michael William Dudleston Jones, North Ferriby; Nicholas Geen, Hunmanby; Mischka Hughes, Stamford Bridge, all of (GB)

(73) Assignee: P2i Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/048,621

(22) Filed: Mar. 26, 1998

Related U.S. Application Data

(63) Continuation-in-part of application No. 08/329,948, filed on Oct. 24, 1994, now Pat. No. 5,748,931.

(51) Int. Cl.$^7$ ............................................. G06F 15/00
(52) U.S. Cl. ...................................... 707/525; 707/526
(58) Field of Search ................................ 707/515, 500, 707/514, 517, 525, 526, 531, 1, 3, 7, 513; 382/173, 176–177, 180, 305

(56) References Cited

U.S. PATENT DOCUMENTS

| | | | | |
|---|---|---|---|---|
| 5,241,624 A | * | 8/1993 | Torres | 395/429 |
| 5,300,943 A | * | 4/1994 | Jakobs et al. | 345/1 |
| 5,347,632 A | * | 9/1994 | Filepp et al. | 709/202 |
| 5,502,637 A | | 3/1996 | Beaulieu et al. | 705/36 |
| 5,524,201 A | | 6/1996 | Schwarts et al. | 345/326 |
| 5,553,277 A | * | 9/1996 | Hirano et al. | 707/104 |
| 5,623,652 A | | 4/1997 | Vora et al. | 707/10 |
| 5,623,681 A | * | 4/1997 | Rivette et al. | 707/522 |
| 5,624,265 A | * | 4/1997 | Redford et al. | 434/307 R |
| 5,675,788 A | | 10/1997 | Husick et al. | 707/104 |

(List continued on next page.)

FOREIGN PATENT DOCUMENTS

| | | |
|---|---|---|
| WO | WO 93/15466 | 8/1993 |

OTHER PUBLICATIONS

Microsoft Word User's Guide, Microsoft Corp., Document No. WB57923–0394, pp. 17–20, 267, Aug. 1994.*

*Primary Examiner*—Joseph H. Feild
(74) *Attorney, Agent, or Firm*—Leighton K. Chong

(57) ABSTRACT

A computerized information display system extracts text data, lists of keywords, story rankings in order of story importance, and image maps identifying the location of stories from an input of publication files from a publisher. The system can generate a simultaneous display of a page image in which a story appears side-by-side with the text for the story when a particular story is selected, in order to allow a viewer can read the text while referring to the page image for visual cues about the text passage. The viewer can select a story from a displayed list of stories ranked in order of importance relative to other stories appearing on a page. The story rankings are derived based upon comparing one or more story importance indicators: location of the story on the page; size of type font of a headline associated with the story; size of type font associated with the story text; and size of text content for the story. The viewer can navigate to the text for a story on a displayed page by clicking in the story area on the page which is linked by image maps to the corresponding text passage. The viewer can also navigate to a text passage and page image by clicking on a keyword from a list of keywords extracted from the text input from the publisher. These computerized contextual display and image navigation tools allow the viewer a highly interactive experience with the publication. They allow a publication to be converted to electronically viewable form frequently, e.g., several times per day, and in a more user friendly form than the original printed copy.

16 Claims, 12 Drawing Sheets

U.S. PATENT DOCUMENTS

| | | | | |
|---|---|---|---|---|
| 5,689,648 A | * | 11/1997 | Diaz et al. | 705/26 |
| 5,706,365 A | * | 1/1998 | Rangarajan et al. | 382/230 |
| 5,748,931 A | * | 5/1998 | Jones et al. | 395/356 |
| 5,749,735 A | * | 5/1998 | Redford et al. | 434/307 R |
| 5,788,507 A | * | 8/1998 | Redford et al. | 434/307 R |
| 5,819,259 A | * | 10/1998 | Duke-Moran et al. | 707/3 |
| 5,835,087 A | * | 11/1998 | Herz et al. | 345/327 |
| 5,892,509 A | * | 4/1999 | Jakobs et al. | 345/331 |
| 5,930,809 A | * | 7/1999 | Middlebrook | 707/501 |
| 5,957,695 A | * | 9/1999 | Redford et al. | 434/307 R |
| 5,960,383 A | * | 9/1999 | Fleischer | 704/9 |
| 6,012,053 A | * | 1/2000 | Pant et al. | 707/3 |
| 6,018,749 A | * | 1/2000 | Rivette et al. | 707/525 |
| 6,026,388 A | * | 2/2000 | Liddy et al. | 707/1 |
| 6,029,195 A | * | 2/2000 | Herz | 709/219 |
| 6,070,158 A | * | 5/2000 | Kirsch et al. | 707/3 |
| 6,119,114 A | * | 9/2000 | Smadja | 707/7 |

* cited by examiner

PREVIOUS NEXT
STORY STORY    CONTENTS    PREVIOUS  NEXT
                           PAGE      PAGE                        PAGE PREVIEW

BUSINESS DAY EVENING STANDARD

Page 33
- German cheer for shares and bonds
- £90m BAe targets Jetstream deal
- Japanese put £520m faith in Scotland

Page 35
- Looking good all round at Laporte
- Exco in the money
- Guthrie's newcomer
- Euro row over media stakes curb
- Barratt lifted by Docklands boom

CONTENTS PAGE
(MOUSECLICK ON
ITEM DISPLAYS
FULL STORY AND
PAGE PREVIEW TO
RIGHT)

Page 36/37
- New engine to put drive back in shares
- How Al scooped the jackpot with the lottery down in Texas
- Pick up your free colour map and guide to the City today

Page 38
- High pressure zone over the Atlantic
- Sky's the limit for techno revolution
- Wing Tips BUSINESS DAY, 141-143 DRURY LANE, LONDON WC2B 5TS, TEL:071-938 6902
— FIND: STRING ENTRY FIELD

COMPANY... [FIND]
COMPANY INDEX    — FIND (FIND TEXT STRING IN ANY STORY)

PAGE NUMBER

PREVIOUS STORY — NEXT STORY — CONTENTS — PREVIOUS PAGE — NEXT PAGE

PAGE NUMBER: 34

BUSINESS DAY   EVENING STANDARD

Electricals
Engineering and Metal
Food, Hotels
Health, Household
Insurance
Leisure
Media Find [BOC]  ← FIND (COMPANY NAME IN ANY SECTOR) RESULT DISPLAYED IN LOWER FIELD.

SECTOR LIST (MOUSECLICK ON SECTOR DISPLAYS SECTOR LISTING IN LOWER FIELD)

INDUSTRIALS

| Company | High | Low | Price | Var |
|---|---|---|---|---|
| AAF Inds | 45 | 40 | 44 | -3 |
| AB Ports | 290 | 284 | 288 | -3 |
| ADT | 720 | 690 | 703 | -2 |
| Airspring | 290 | 205 | 255 | +18 |
| AlumascGp | 325 | 300 | 320 | -1 |
| ArmourTst | 45 | 40 | 44 | -3 |
| Avon Rbr | 290 | 284 | 288 | -2 |
| BAT Ind | 720 | 690 | 703 | -2 |
| BLP Gp | 290 | 205 | 255 | +18 |
| BOC | 325 | 300 | 320 | -1 |
| BSS Gp | 45 | 40 | 44 | -3 |
| BTR | 290 | 284 | 288 | -3 |
| BairdWm | 720 | 690 | 703 | -2 |
| Baynes Ch | 290 | 205 | 255 | +18 |
| Beckenham | 325 | 300 | 320 | -1 |
| Benson Gp | 45 | 40 | 44 | -3 |
| Bespak | 290 | 284 | 288 | -3 |
| Bibby J | 720 | 690 | 703 | -2 |

COMPANY... [FIND]  — FIND (FIND TEXT STRING IN ANY STORY)

COMPANY INDEX

[MARKET PRICES] — PAGE PREVIEW

BUSINESS DAY, 141-143 DRURY LANE, LONDON WC2B 5TS, TEL: 071-938 6902

FIND: STRING ENTRY FIELD

FIG. 6

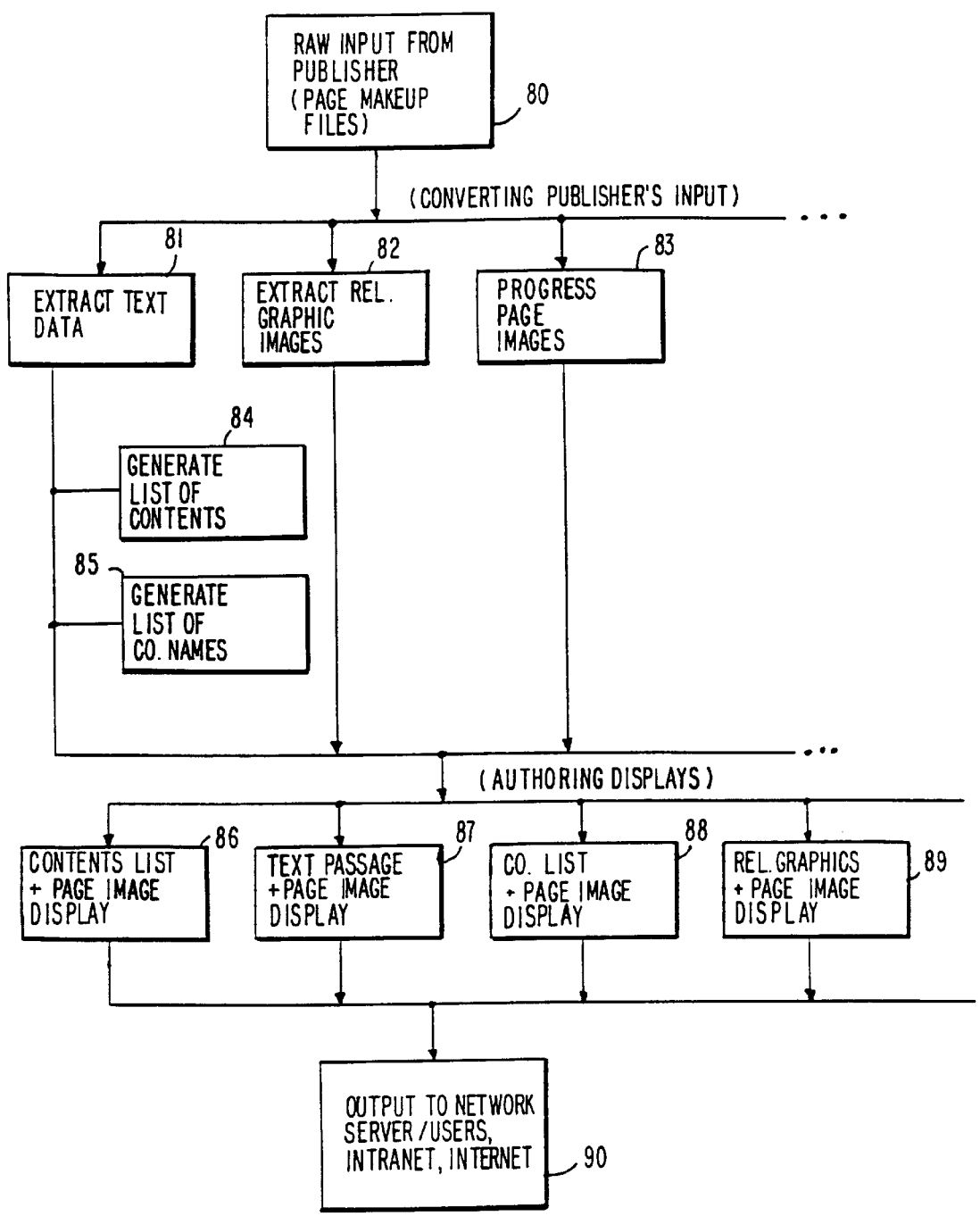

| AREA | STORY/PIECE | TEXT LOC. |
|---|---|---|
| 1 | (WEATHER) | 0100... |
| 2 | (HEADLINE) | 0150... |
| 3 | (INDEX TO ISSUE) | 0180... |
| 4 | STORY #1 | 1010... |
| 5 | PHOTO, STORY#2 | 2050... |
| 5A | STORY# 2 | 2010... |
| 6 | STORY# 3 | 3010... |
| 7 | STORY# 4 | 4010... |
| ⋮ | ⋮ | ⋮ |

PUBLICATION FILE CONVERSION AND DISPLAY

This patent application is a continuation-in-part of commonly-owned U.S. patent application Ser. No. 08/329,948, having inventors in common, filed on Oct. 24, 1994, entitled "Information Display System For Simultaneously Displaying Graphical Images and Text Of A Publication", which has issued as U.S. Pat. No. 5,748,931 on May 5, 1998.

FIELD OF THE INVENTION

The present invention relates to a method and system for converting digital publications files into digital data, and the use of that data to generate a display on a computer system. Aspects of the invention relate to an information display system and more particularly to an information display system which provides for the simultaneous display of a graphical representation of a printed publication, or part of a publication, and text data appearing in the printed publication.

BACKGROUND OF THE INVENTION

In today's society, particularly in the business community, it is a necessity to receive published information as quickly as possible. This is especially important for financial information. Thus, the desire to provide such information in electronic form has expanded rapidly in recent years.

In the United Kingdom, there are a number of suppliers of news information delivered electronically or on-screen or other media consumption. These can be segmented into a number of categories:

(a) an electronic text feed of general and specific news items, and data where the only structure consists of headers detailing news category orders (e.g. Press Association);

(b) an electronic text feed of news items addressing specific market sectors (e.g. Extel Finance);

c) an electronic text feed (not in real time) providing the textual information contained in previously published material. This information provided for archival and search activity as a primary facility (e.g. FT Profile).

The common component of these information provisions is their emphasis on editorial quantity, leaving the editorial and sub-editorial functions to the consumer. Essentially they are providers of a raw material to be used by the customer base as one of their ingredients for the production of their products, or as data for customers to filter to generate information for their own internal or external use. Thus, with this vast quantity of raw data provision with no relative importance attached to each of the individual news items, the user is forced to sift through irrelevant and/or unimportant information to discover their requirement. Additionally, the feeds are, in general, specifically objective rather than subjective.

A further disadvantage of this method of supplying information is that only text information can be provided. Although this text may be searchable or processable, as opposed to a graphical image or microfiche of the publication, it contains less information than the publication. In particular, editorial, information is lost. The foregoing problems of prior art information systems manifest the need for improvement. Specifically, there is a need for an information display system that can make use of information provided in publications such as newspapers and magazines in real time thereby benefiting from the editorial experience of the publishers. Furthermore, since a great deal of information can be obtained from the editorial layout of the publication, the foregoing need can be greatly enhanced by the provision of a simultaneous image of the actual publication together with the actual text in the clear and legible form.

SUMMARY OF THE INVENTION

The present invention provides a screen based information display system which utilizes both the graphical images of pages of a printed publication as well as its text data. The present invention allows for the simultaneous display of an image of the pages of a publication and text data. It is not sufficient merely to provide a readable image of the pages of the publication as this only provides a microfiche representation. Whereas this allows the user to read the text, it does so at a representational level which does not give the overview perspective. The user "cannot see the wood for the trees", is a realistic analogy. The purpose of providing a simultaneous image of the publication is to allow the user to interpret the editorial importance that has been attached to articles, thereby allowing the user to benefit from the editorial experience or the publishers, as well as giving immediate access to the edited text.

The present invention allows for a user to select a passage of text composing an article or story on the displayed page of the publication whereby the system of the present invention will simultaneously display the text of the passage adjacent to the image of the full page of the publication. This allows the user to clearly read the article if desired in view of the small size of the image of the page of the publication the text is not clear and therefore it is highly advantageous to provide a clear copy of the text separately. The provision of the text separately also allows for further advantages of the present invention including allowing for identifier words such as company names to the clearly seen e.g. highlighted. The present invention provides for further information on the identifier word e.g. company information to he displayed, by the selection of the identifier word. The further information e.g. company reports, can then be displayed simultaneously with the image of the page of the publication.

A further feature of the present invention is that a list of contents of the pages of the publication can be displayed, wherein the list of contents for each page are displayed such that the passages of text (articles or stories) are listed in the order of importance which can be attached to them by the way in which they are formatted on the page of the publication by the editors. Thus, the list of contents for the publication provided by the present invention provides for an easy means for the important passages in the publication to be identified by a user. When a particular passage is identified which the user wishes to read, this can be selected and the text displayed along with the image of the page of the publication from which the text is taken.

The present invention is particularly applicable to business and financial publications such as newspapers. For example, in the United Kingdom, the London Evening Standard is published five times during a day with the financial information in each publication being updated. Electronic data or each publication can be obtained rapidly from the publisher thereby allowing the information display system or the present invention to be updated rapidly in response to each new edition. The present invention thus removes the need for financial institutions to have to purchase multiple hard copies or the newspaper. Instead, the information can be provided electronically over a network to as many users in the institution as is required. Furthermore, the information provided is in a far more user friendly form than the original hard copy and reaches the user rapidly, even where the publication is printed some distance from the desired user, e.g. overseas.

According to a first embodiment there is provided a computerized method of generating an information display from an input of publication files containing text, graphics, and other data viewable as page images of a publication having stories (text passages) and graphics images appearing herein, comprising the steps of: extracting text data from the publication files corresponding to stories appearing in the page images of the publication, and maintaining them as text data files; processing page images from the publication files and maintaining them as page image files; mapping story areas for respective stories appearing in the page images and indexing each story area to a text data file corresponding to the text passage in the story area, and maintaining the mapped story areas as image map files; and generating a display or a computer system of page images using the page image files, and linking the stories in the story areas of the displayed page images to the corresponding text data using the text data images and image map files.

According to a second embodiment there is provided a computerized method of generating an information display from an input of publication files containing text, graphics, and other data viewable as page images of a publication having stories (text passages) and graphics images appearing therein, comprising the steps of: extracting text data from the publication files corresponding to stories appearing in the pace images of the publication, and maintaining them as text data files; parsing the text data to find predetermined keywords appearing therein, indexing each keyword to a page number and a story number for the story corresponding to the text passage in which the keyword is found, and maintaining the indexed keywords on a keyword list; processing page images from the publication files and maintaining them as page image files; generating a display on a computer system of the keyword list, and displaying the page image containing the story in which a selected keyword appears when the keyword is selected from the keyword list.

According to a third embodiment there is provided a computerized method of generating an information display from an input of publication files containing text, graphics, and other data viewable as page images of a publication having stories (text passages) and graphics images appearing therein, comprising the steps of: extracting text data from the publication files corresponding to stories appearing in the page images of the publication, and maintaining them as text data files; processing page images from the publication files and maintaining them as page image files; assigning to each story appearing on a page of the publication a cage number on which the story appears, and a story number ranking corresponding to the relative importance of the story to other stories on the page; indexing the text data files to the page numbers and story number rankings for the corresponding stories appearing in the page images of the publication; generating a display on a computer system of a page image using the page image files, and a side-by-side display of a list of story titles for the stories appearing on the displayed page ranked in order of their assigned story number rankings.

BRIEF DESCRIPTION OF THE DRAWINGS

FIG. 2 illustrates a display generated during the operation of the system illustrated in FIG. 1;

FIG. 5 illustrates yet another display generated by the system of FIG. 1;

FIG. 6 illustrates a still further display generated by the system of FIG. 1;

FIG. 8 depicts an overall process flow for converting raw publisher input to simultaneous text/image display of a publication.

DETAILED DESCRIPTION

Figure 1:
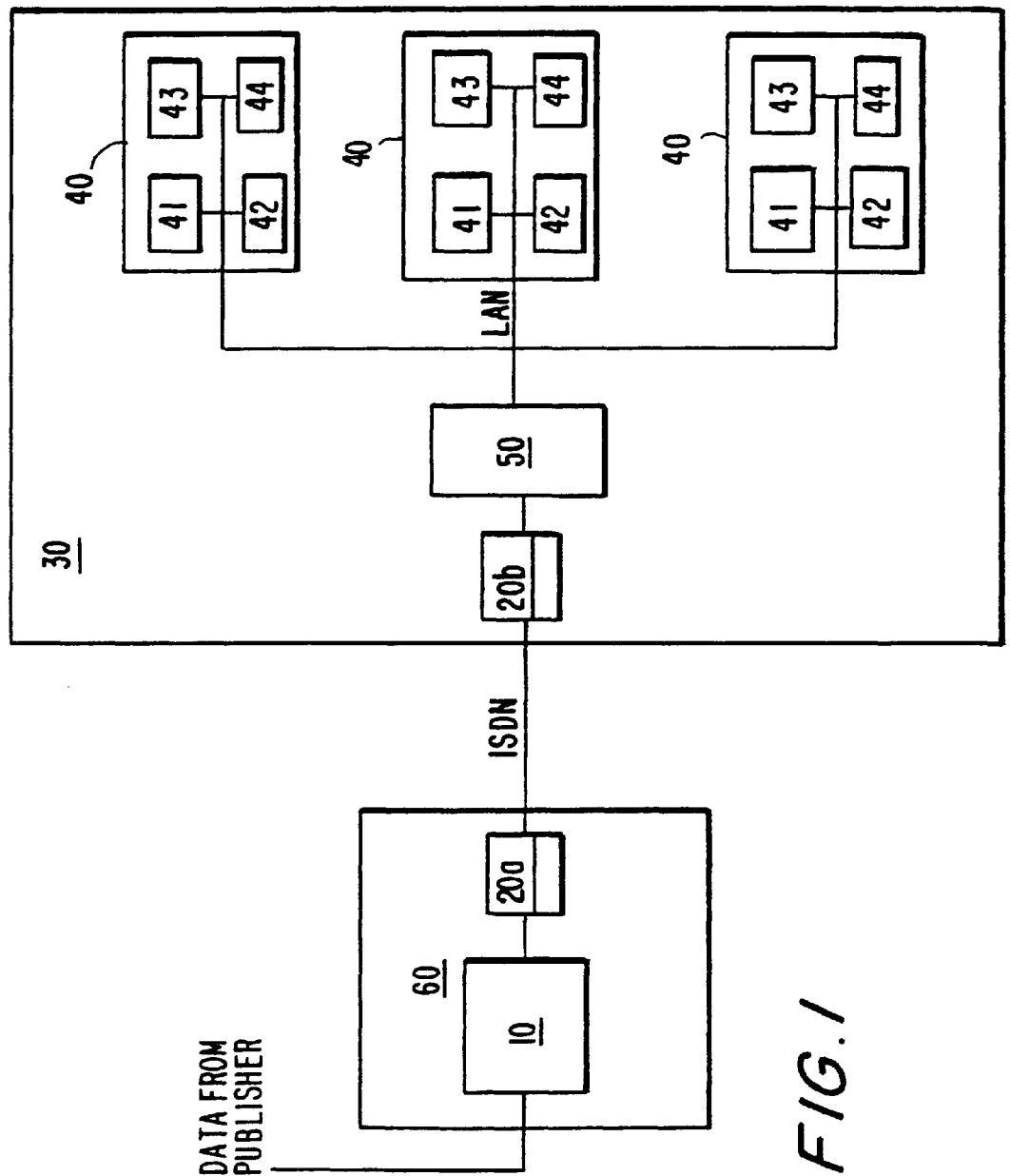
FIG. 1 illustrates an exemplary embodiment of a system for implementing the present invention.

Referring now to the drawings, and initially to FIG. 1, there is illustrated an exemplary embodiment of a system for implementing the present invention. Data is received from the publisher in electronic form by the central storage and processor unit 10 whilst it is highly desirable that the data be obtained from the publisher in electronic form, it is not essential to the principle of the present invention. Any means of providing images of the publication and separate text data will suffice.

Within the central storage and processor unit 10, portions of each page of the image which correlate to passages of text are defined and the defined portions are correlated with the passages of text. A list of contents for the passages of text is then generated by selecting the headings from each passage of text and ordering these in order of importance which can be attached to each passage of text by studying the image of the page of the publication. For instance, where an article has the largest heading in the publication of a newspaper, clearly this is the most important story of that page. Similarly, if an article has the smallest heading, this is the least important story on that page and is thus placed at the end of the list of contents for that page. Once the list of contents is generated, this is stored or later assimilation into the invention. A detailed description of an exemplary process for the above is provided in the section below entitled "Ordering Text Passages and Generating A List of Contents".

The image received from the publishers or obtained from the publication requires enhancement of visual quality and therefore in an embodiment of the present invention the received image is sharpened to improve the definition and therefore make it clearer when displayed. A detailed description of an exemplary process for the above is provided in the section below entitled "Enhancing Visual Quality Of Page Images".

Within the text information there will be certain words such as company names which can serve as identifier words for which the central storage and processing unit 10 has further information which can be made available to the user. Therefore, the text data which is received from the publisher is searched and compared with known identifier words such as company names. The identified identifier words are then flagged in the text and are also entered into an index which is then stored for later assimilation into the invention. A detailed description of an exemplary process for the above is provided in the section below entitled "Generating a List of Identified Words".

Additionally, within the page images and text information, there will be stock market equity price information from a variety of Stock Exchanges around the world, together with the price movement on those equities. These prices and price movements will be those standing at the time of the publication of the newspaper. Within the central storage and processing unit 10 there is additional information on many equity companies, including the current real time price of these equities.

Therefore, the text data and the images which are received from the publisher is searched and the particular companies used within the publication identified and the further information and real time price data within the central storage and processing unit 10 can be made available for the user when assimilated into the invention. A detailed description of an exemplary process for the above is provided in the section below entitled "Linking Identified Information With Further Data".

Thus, the information that is available from the central storage and processing unit 10 is a series of images of pages of the publication, the text corresponding to the articles or passages in the publication, which passages of text have been correlated with the particular portions in the image, a 1list of contents of the passages of text listed in order of importance or each page, an identifier word index identifying the words e.g. company names in the text for which further information is available, and further information on the identifier words e.g. company prospectuses or statistical information together with real time equity price and other information on the companies within the market price pages of the newspaper.

The series of steps to compile this data will be carried out for each publication. Thus, in the case of a newspaper for which there are several publications in a day, this process must be carried out each publication as quickly as possible in order that the information can be made available to users without delay.

The central storage and processing unit 10 can then communicate the stored information using a communication link 20a and 20b to a single user or group of users 30 such as a financial institution. In FIG. 1 the communication link is a high speed ISDN telephone line. However, any form of communication can the used such as internet, cable, satellite or radio. Typically, n such an institution where a plurality of users require information, each user will be provided with a personal computer or terminal 40 which is connected via a local area network (LAN) to a central processor which is for instance a file server 50 which receives the information via the communication ink 20a and 20b from the central storage and processing unit 10. A detailed description of a specific implementation for the above is provided in the section below entitled "Output Of Information System Displays To Users".

Thus, each personal computer or terminal 40 has access to all the information available from the central storage and processing unit 10 at the remote location 60. The central storage and processing unit temporarily stores the information as a digital data structure before transmission in a memory and each personal computer or terminal 40 stores the information as a digital data structure on reception, in a memory. Each personal computer or terminal 40 comprises a central processor unit 41, a memory 42, a display 43 and an input device 44 such as a keyboard and/or a pointing device such as mouse or tracker ball.

In order to make the interface of the computer system with the user as easy as possible, according to one embodiment of the present invention, the software utilized in the personal computers 40 operates on the basis of displayed icons which illustrate and control the running of options. The icons are selectable and operable by a pointing device such as a mouse. Each of the icons forms part of the control item, the other part being a link to a text file, page image file or other displayable information. Selecting the icon activates the control item which uses the link to retrieve and display the displayable information. However, the present invention is not limited to the use of a cursor movement device such as a mouse and instead any means of inputting selections and commands, e.g. a keyboard falls within the scope of the present invention.

Referring now to FIG. 2, there is disclosed an image which is displayed when the embodiment of FIG. 1 is in operation. On one half of the screen there is a page preview of a page of the publication and the page number (page 33) is indicated as well as, the title in the top left-hand part of the display. In the left-hand part of the screen there is displayed a list of contents for the pages of the publication listed by page number and for each page number the articles are listed in order of importance. The list of contents can be scrolled up or down and the next and previous pages of the publication shown on the page preview on the right-hand side of the display can be selected, although in this Figure there is no previous page since this publication has no pages prior to page 33. Icons are provided at the top of the screen to allow either the next or previous page image to be viewed. Each icon is part of a control item, the other part being a link to a page image file of the next or previous publication page respectively. Selecting an con activates the control item which uses the link to retrieve and display the relevant page image file. The display of the list of contents is selectable by selecting the contents option at the top left-hand part of the display by moving the cursor and depressing the mouse button i.e. "clicking" on that icon. This activates a control item and the link to the list of contents file is used to retrieve and display the list of contents. It is also possible to select an article on a page to be displayed by moving the cursor to point out the article listed in the contents and clicking on it. This will activate a control item and the text file will be retrieved via a link to display the text of the article in the left-hand part of the display while in the right-hand part of the display the image of the page on which the article appears will be shown.

Figure 3:
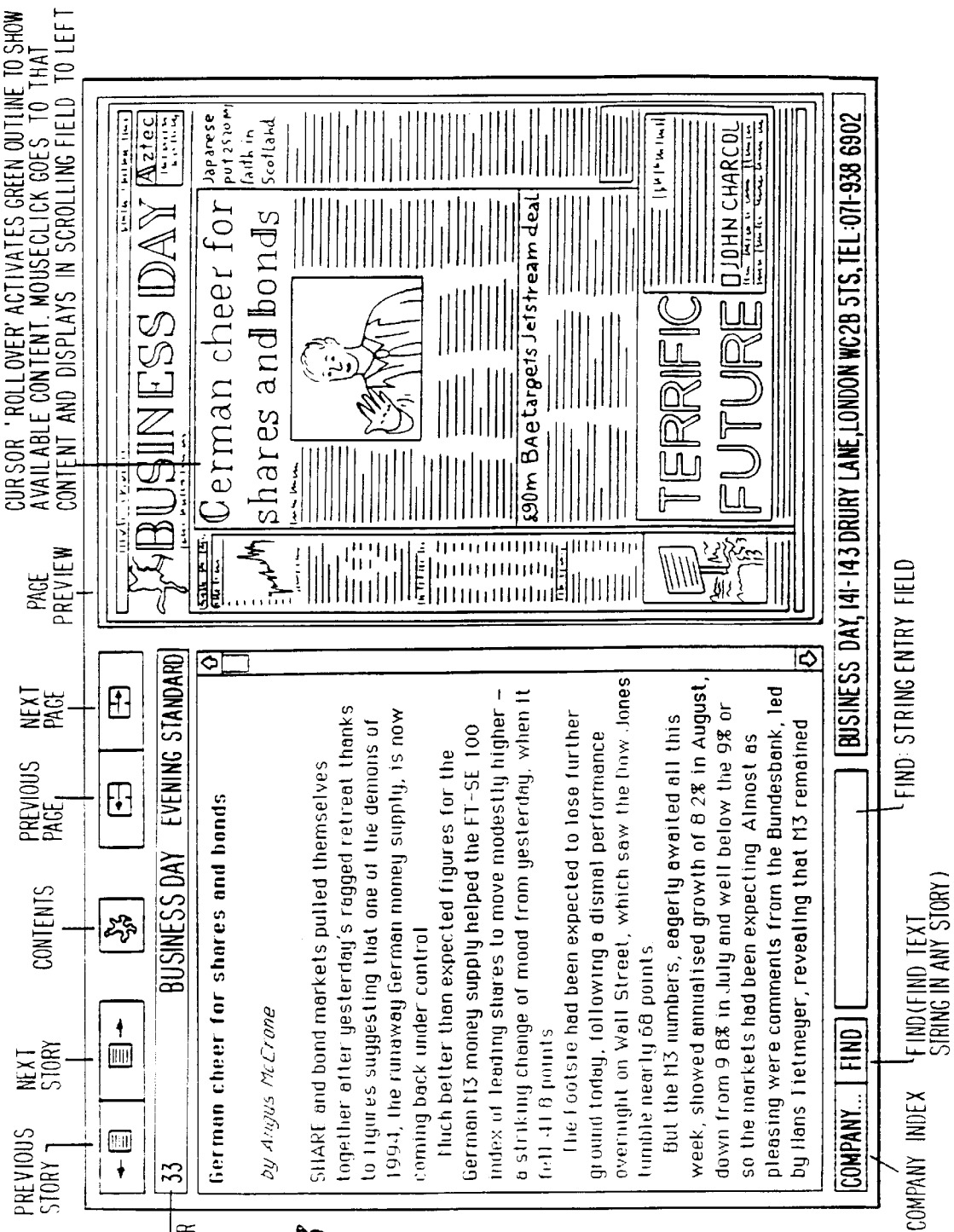
FIG. 3 illustrates another display generated by the system of FIG. 1.

Referring now to FIG. 3, in this display the article headed "German cheer for shares and bonds" has been selected by moving the cursor to the portion of the image and cocking on it. The image is then highlighted by coloured border or indicated by a web browser with an "active" icon, e.g., a pointing finger as used in the Netscape Navigator™ browser, while on the left-hand side of the screen the text of the article is displayed. The text displayed car be scrolled up or down in a conventional manner. At the top left-hand part of the screen icons are provided to allow either the previous or next story to be selected. Each icon is part of a control item, the other part being a link to the text file of previous or next story respectively. Selecting the icon activates the control item which uses the link to retrieve and display the relevant text file. In the display of FIG. 3 there is no previous story since the selected story or article is the first of the publication.

Within the story or article there may appear references to companies. When such references occur, these are highlighted in the text and a user can select to view further information on that company by moving the cursor to the highlighted text acting as an identifier word and clicking on it. The highlighted text (identifier word) acts as an icon and forms part of a control item, the other part of the control item being a link to further information. Clicking on the identifier word activates the control item and causes the retrieval and display of further information in at least the left-hand part of the screen. Such further information can for example be a company prospectus or company report.

FIGS. 2 and 3 also show in a bottom left-hand part of the display that the icon "find" is available. Next to this, it is possible to enter a string of text which the user wishes to find within the text of the publication, once the text string is entered in the string entry field and the "find" icon is activated. Once the text string is found within the text, the article in which it appears is displayed in the left-hand part of the display together with the page on which it appears in the right-hand part of the display. The text string within the article is highlighted.

Figure 4:
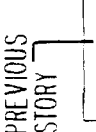
FIG. 4 illustrates a further display generated by the system of FIG. 1.

The display in this embodiment of the present invention is provided with the ability to select a company index. This is provided for in the bottom left-hand corner of the screen as a "Company" icon. This icon forms part of a control item, the other part being a link to a company index. Selecting the icon activates the control item which uses the link to retrieve and display the company index. When the icon is selected, the display of FIG. 4 is generated. In FIG. 4 in the left-hand half of the screen, an index of the companies referred to in the publication is given. By moving the cursor to a particular company name and clicking on it, text is displayed on the left-hand side in which the first mention of the company name occurs and on the right-hand side of the display there is displayed the associated page of the publication. Where there are a number of publications per day, the index of companies can indicate next to a company name the publication number during the day in which there is a mention of that company. This gives further information on the number of times a company is mentioned in the publications throughout the day and thus gives an indication on the importance of the activities involving that company.

FIG. 5 illustrates a display of financial information in the publication. In the page of the publication the financial sector can be selected and under that sector the financial information on the companies can be displayed. The financial information available can be far and above what is available in the publication since further financial information is available and can be obtained from other sources and collated in the central storage and processing unit to make it available to users.

Figure 6:
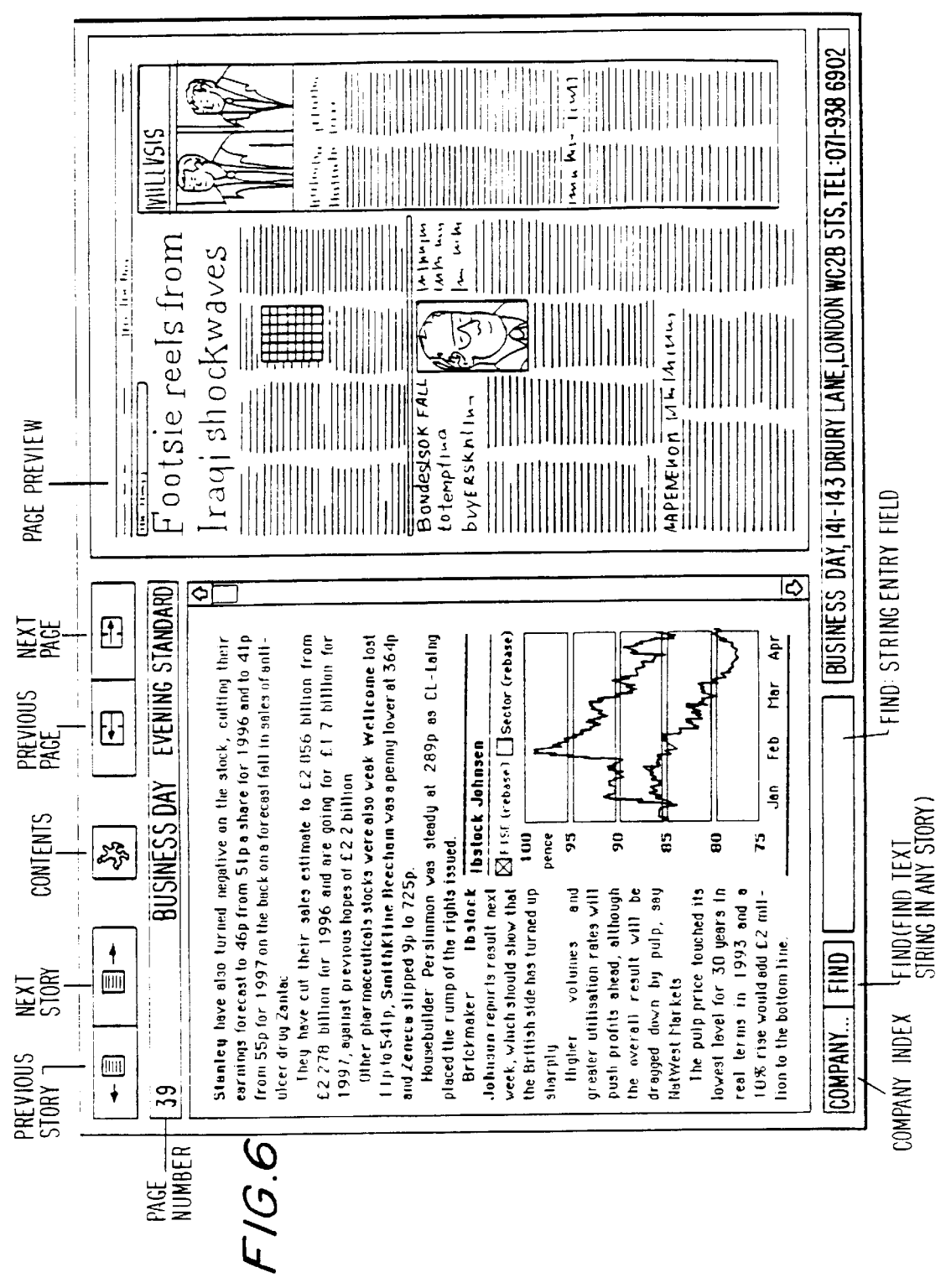

Referring now to FIG. 6, this illustrates a further display wherein the text on the left-hand side of the display not only includes highlighted company names but also includes a processed image which originated from the image portion on the page preview on the right-hand side of the display under the heading "Footsie Reels from Iraqi Shockwaves". The processed image of the graph can be manipulated by the user. Further information over and above what is available from the publication can be included in such processed images. Such further information can be made available from alternative sources and can be combined within the central storage and processor unit 10.

Figure 7:
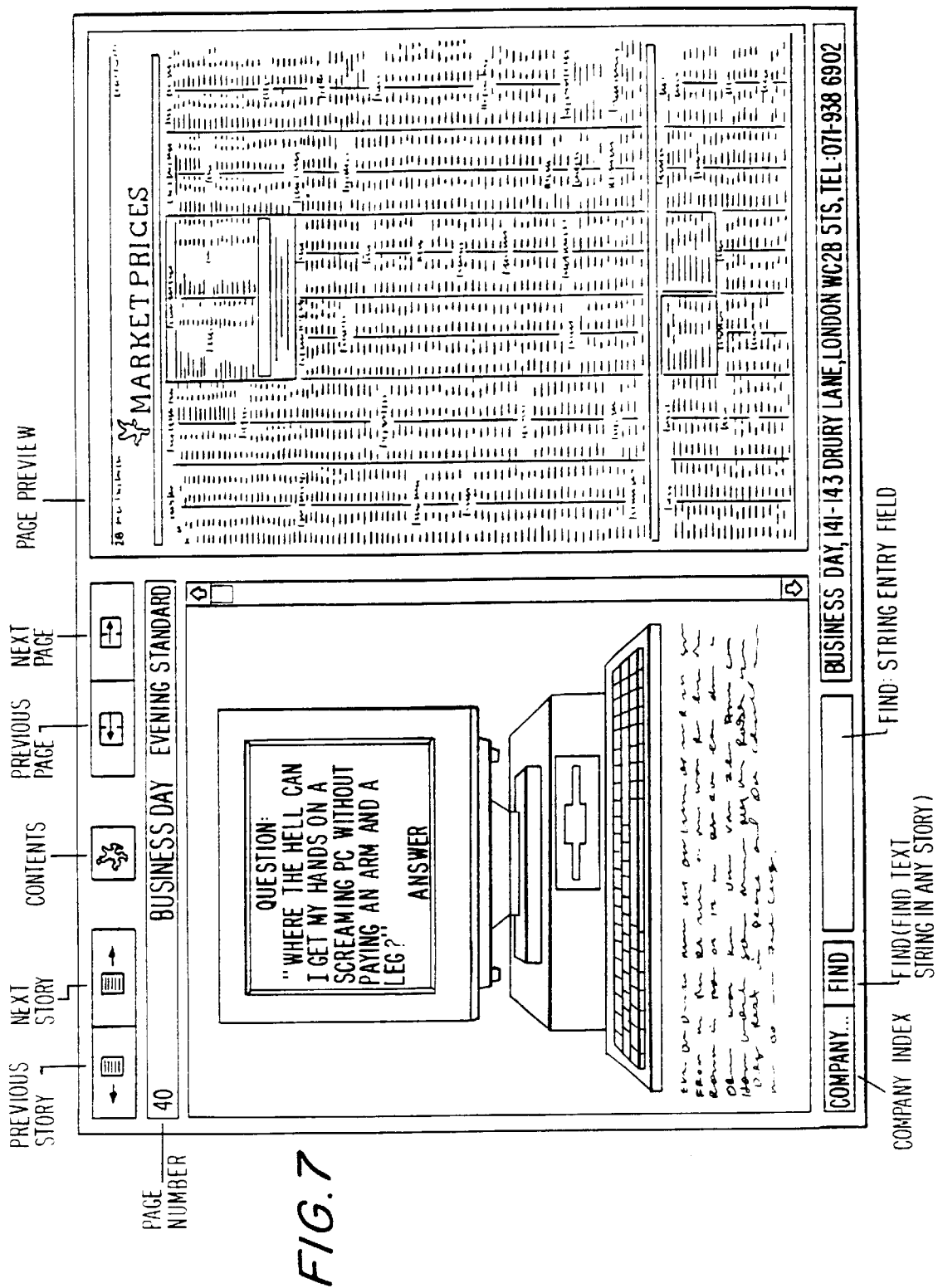
FIG. 7 illustrates another display generated by the system of FIG. 1.

Referring now to FIG. 7, this illustrates a further display wherein further information over and above what is available in the publication is selected and displayed. In the page preview on the right-hand side of the display there is an advert for a computer manufacturer. When the cursor is moved to this portion of the image and clicked on, further information which comprises further advertisement information is displayed in the left-hand side of the display.

When the option of requesting further information is selected, the software moves out of the current application and into another application containing the required additional information. Such further information can take any form such as graphical textural and video information, thus allowing the present invention to operate as a multi-media software system. Thus, the information display system of the present invention, by providing both a graphical image of a publication and the text data, acts as a gateway through the publication into a vast array of further information which can be image available to the user via the central storage and processing unit 10.

A specific implementation of the information display system of the present invention is described in detail below for a given example of an electronic publication. For the described implementation, an overall process for converting raw publisher input to simultaneous text/image display of a publication is depicted in FIG. 8. The conversion process includes the steps of extracting text data and related graphic images and processing page images (indicated at blocks 81, 82, 83) from the publisher's raw input (80), generating a list of contents (84) and a list of company names (85), authoring the simultaneous text/image displays of the publication (86, 87, 88, 89), and providing the information display system as an output to server/users on a network (90). It is to be understood that the invention is not limited to the described implementation, and may be implemented in any equivalent manner using the disclosed principles of the invention.

Ordering Text Passages and Generating a List of Contents

The information display system requires two basic types of input, text data and images of pages of a publication. The publisher typically provides the new data for an issue of a publication in digital electronic form, for example, as publication files such as Quark XPress™ files or as PDF (Portable Document Format) files used in page makeup systems and readers offered by Adobe Systems, Inc., of Boston, Mass. Text is extracted from the Quark XPress™ or PDF files using the built-in functionality of the page makeup program and classified as data entries for storage and retrieval from a data base as digital text data files. The text of each story has a corresponding digital text data file. The page images can be created from Quark Xpress™ files by first producing EPS (encapsulated Postscript) files, or from PDF files by first converting them into EPS files. Each page image is stored as a digital page image file. The processing of the publication files to create page image files can be automated as described in the section "Enhancing Visual Qualify of Page Images".

The publication on files are in a format suitable for editing the publication document or printing the publication document. The publication document consists of a number of pages each of which contains one or more stories. Each story has at least a head line and a text portion and may in addition have an associated picture. A representation of each page in the published document is produced from the publication files and stored as digital page image files as described in the section entitled "Enhancing Visual Quality of Page Images". Each page image file is associated with the page of the publication on which it appears and can be used to reproduce the image of the page on a visual display unit. Each page image file may be a bitmap of one page of the publication.

The publication files are also processed to extract from each page, the stories which are on that page and for each of those stories the headline, text portion and any pictures associated with that story. This process of extraction may be achieved in any one of three ways.

According to a first method, the publication files contain additional format data which identifies where each story is positioned within each page and where each story starts and ends, where each story's headline starts and ends and the font size of the text used within the headline; where the body of text making up the story starts and ends and the font size of text; and where any picture associated with the story is placed within the page. Such format data is not observable in the image of the published document but describes or controls the format of the published document. A digital processor operates on the digital publication files to extract this additional format data and to create data files For each story including: a headline text file containing information identifying at least the text content of the headline and the headline font size; a story text file containing the text of the story and information identifying the text font size; a picture file containing information sufficient to reproduce a picture associated with the story such as a bit map image of the picture; a picture position file indicating where the associated picture is placed in relation to the text; and a story position file indicating the limit of the boundary of the story in the page image.

A second method can be used in the absence of additional format data in the publication files. In this method, format data can be derived from the publication files by a digital processor. The first stage is the determination of the number of separate stories in a page of the publication. This is achieved by using the format used to divide individual stories, which may be lines or blank margins for example, to identify the boundary of each story. The processor having identified the number of stories on the page takes each story in turn, and for each story produces data files including: a story position file, a headline text file, a story text file, and if appropriate a picture file and picture position file. The story position file is produced by identifying the limit of the boundary of the story within the page image. The headline text file is produced by identifying the text within the boundary of the story which has the largest font size. The headline text file stores the text of the headline and information identifying the size of the font. The processor may then assign any remaining text within the body of the story to the story text file and also store information identifying the font size of that text. The processor may then identify pictures, within the boundary of the story and create a picture file containing a bit map image of the picture and a picture position file storing information identifying where the picture was positioned within the story. The processor then goes through the same process for each of the stories on the page and for each page within the publication.

According to a third method, an operator creates the data files including the headline text file, the story text file, the story position file and any picture files and picture position files by selecting areas of the image of the publication displayed on a visual display unit using a cursor control device. The limit of the boundary of the story in the page image is first selected and this information is stored in the story position file. The operator then selects the headline of the story and a headline text file is created which stores text data and information identifying the font size of the text. The operator then selects any pictures in the story and the bit mapped image of the picture is stored in a picture file with the positioning of the picture within the story being stored within a picture position file. The digital processor then stores the remaining text within the boundary of the story which has not previously been selected and information identifying the font size of the text in a story text file.

A data structure is now produced which interlinks the various components of the publication including the data files and the page image files. A RECORD is created for each story on each page. Each RECORD has a one-to-one correspondence with a story on a page. Each RECORD contains a number of fields which associate the RECORD to the data files and page image files of its corresponding story. The first field is a POINTER to the headline text file of the corresponding story, the second field is a POINTER to the story text file of the corresponding story, the third field is a POINTER to any picture file associated with the corresponding story, the fourth field is a POINTER to the picture position file associated with the corresponding story and the fifth field is a POINTER to the story position file so the corresponding story. Consequently, the digital processor parses the publication into pages thence into stories and each story into its component items such as headlines, text portions and pictures. It produces a data structure consisting of a plurality of data files, page image files and RECORDS which interlinks the components of the publication, and from which the publication can be recreated in different electronic formats.

The RECORDS are now indexed. Each RECORD is indexed by a page number (page_no) and a story number (story_no). For a particular RECORD, the page number indicates the page of the publication on which the corresponding story appears, and the story number identifies the corresponding story amongst the o her stories on that page. Consequently, the combination of story number and page number uniquely identifies each RECORD and its corresponding story. The story number (story_no) is used not only to uniquely identify a story on a page but is also used to indicate the relevant importance of a story in comparison to the other stories on a page. The most important story on a page will be assigned a story number 1 with the value of the story number increasing as the importance of the story diminishes.

The story number can be assigned on the basis of operator judgement or by digital processing. Each RECORD contains fields having POINTERS to data files containing all the information associated with a story. Each of the RECORDS corresponding to the stories on a particular page can be processed to determine the relative importance of the stories on that page. For each of the RECORDS, the processor accesses the associated headline text file, the story text file and story position file. From these files, the processor can, in relation to each of the stories, determine the positioning of the stories on the page relative to one another, determine the headline font sizes relative to each other, and determine the story text font sizes relative to each other. On the basis of this information, the processor can order the stories in relative importance. Generally, any story that continues from a previous page will be given the highest relative importance and the remaining stories will be rated in dependence upon the font size of their headlines with any two stories having the same font size for the headlines being differentiated on the basis of the position of the story within the page and the fort size of the text in the body of the story. It will be appreciated that the model used to weight the relative importance of the various types of format information will depend upon the particular editorial style of the publication and a different model with different weights applied to the different types of format information can be used for different publications. A flow chart of an example of a model suitable for determining the relative importance of a story within a page and creating a list of the stories on a page ordered in terms of their relative importance is shown in FIG. 9b.

Figure 9A:
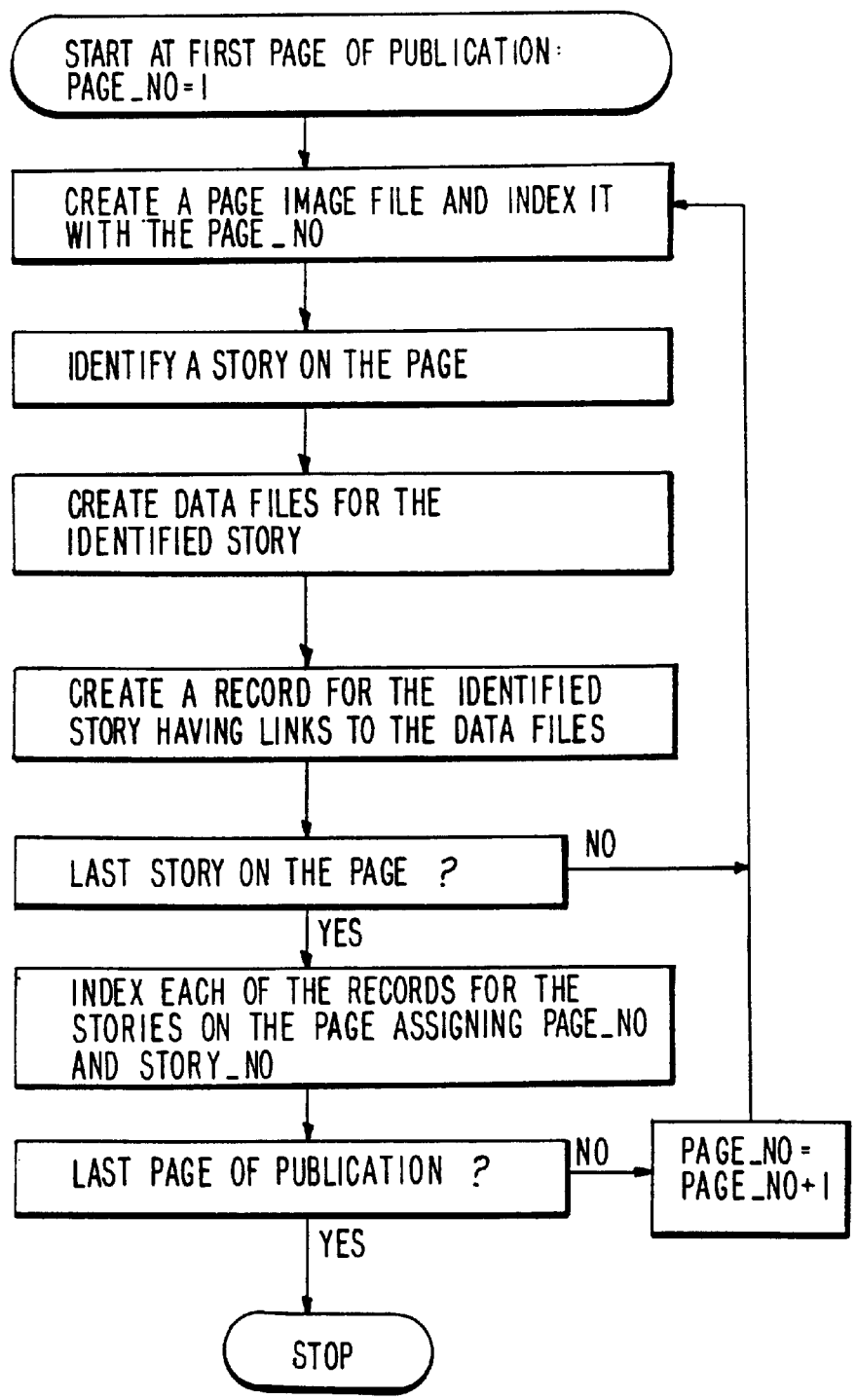
FIG. 9a is a flow chart illustrating one method of converting the publication files supplied by the publisher into a data structure.
Figure 9B:
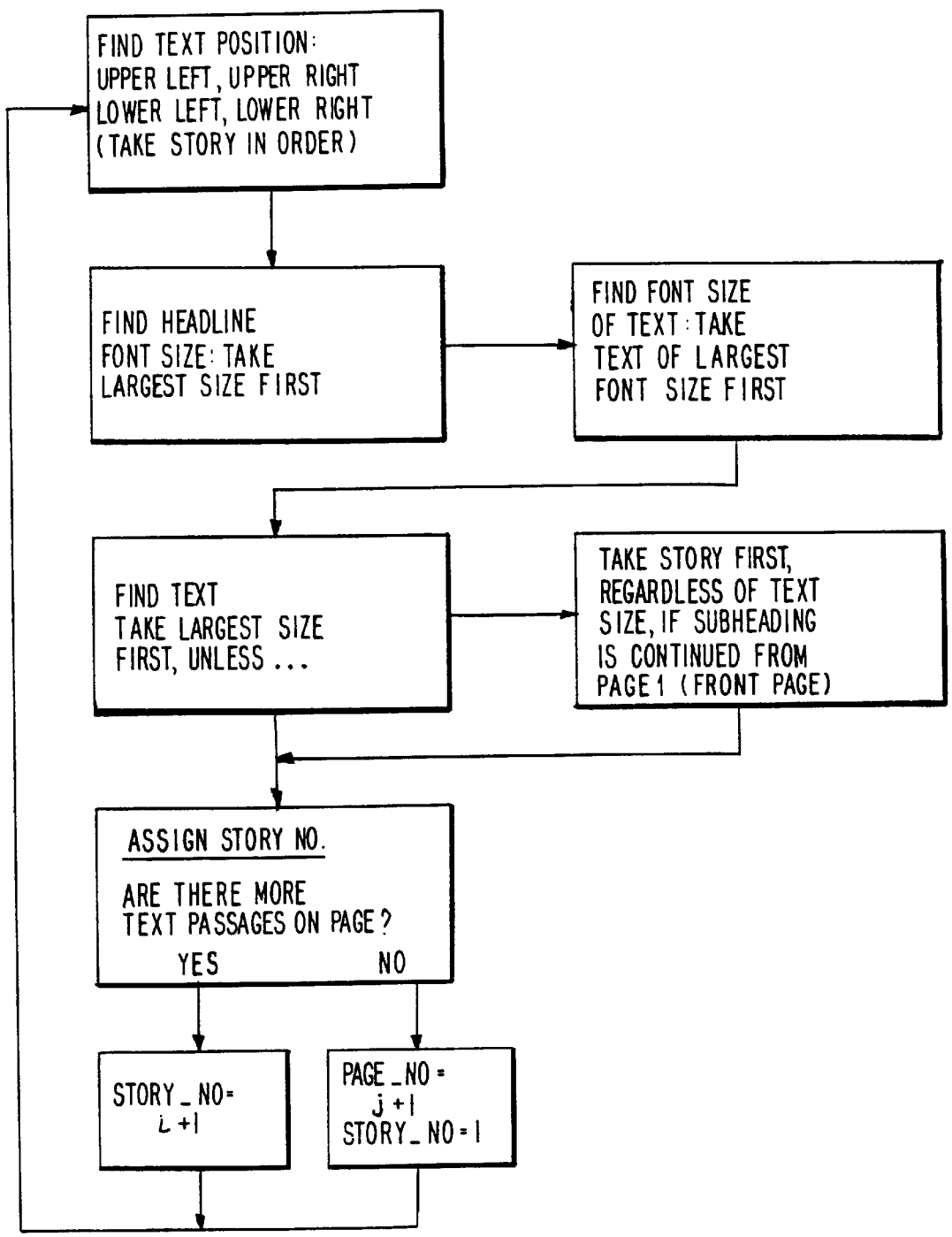
FIG. 9b is a flow chart of an example of an importance-determining model for ordering a list of stories on a page by relative importance.

The process of creating the data structure includes extracting the data files and page image files and creating records is illustrated in FIG. 9a and steps 81,82,83 of FIG. 8.

Once all the stories have been indexed through RECORDS the data structure is processed by means of a digital processor to produce output files, or an output signal which can be used by an end user to access the information stored within the data structure and hence within the publication and display that information on a visual display unit (VDU). The end user will be able to view via the page image files accurate representations of the pages of the publication. The end user will also be able to view the text of each story in a clear form via the story text files. In addition the VDU which the end user is using will have a series of icons on the screen which can be selected by using a pointing device such as a mouse. If an icon is selected the end user is able to navigate through the publication.

According to one example the digital processor processes the data structure and produces an output in a HTML format suitable for use in an end user's browser software such as Netscape Navigator™ or Internet Explorer™. The processing of the data structure transforms the data structure into a code which, on an end user's machine produces an electronic publication having actuatable control items. The control items comprise a visual symbol on the VDU of the end user's machine, such as a word icon, and a link from the visual symbol to other information. In HTML this may be achieved by creating an anchor and a hyperlink. Actuating the visual symbol using a pointing device accesses the other information and enables its display on the VDU. Consequently, when the code is loaded into a computer by an end user a display as illustrated in FIGS. 2 to 7 is produced having a page preview produced from the page image files, a clear text portion produced from the data files and a number of icons for navigating through the publication produced by processing the data structure. These icons include previous/next story icons, previous/next page icons and a contents icon.

The next/previous page icon allows the end user to move through the pages of the publication. If the next page icon is selected the page image file associated with the page following that being currently viewed is loaded or viewing by the user. If the previous page icon is selected the page image file associated with the previous page of the publication is loaded for viewing by the end user.

The next/previous story icons allow the end user to navigate through the stories or a particular page. Selecting the next story icon displays, in clear text format, the story with the next, lower level of importance on the page. This is equivalent to accessing the story corresponding to a RECORD having the same page number but with a story number one greater than the RECORD corresponding to the story currently displayed on the screen. Selecting the previous story icon displays, in clear text formal, the story with the next, higher level of importance, on the page. This is equivalent to accessing the story corresponding to the RECORD having the same page number but having a story number one less than the story number of the RECORD corresponding to the story currently being viewed.

Selection of the table of contents icon displays an ordered list of titles equivalent to ordering the RECORDS firstly according to their associated page number, ordering those RECORDS with the same page number according to their story number, and then accessing through the first field of each RECORD the headline text file for each story and displaying a List of headlines in the same order as the RECORDS. Consequently, a table of contents, as illustrated in FIG. 2, can be produced which illustrates the titles for each page of the publication, ordered in dependence on their relative importance. Each title on the page of the table of contents is an anchor for interactive linking to the story in clear text format and/or page view format.

When a particular page image file is loaded, it is possible for the end user to locate the cursor over a particular story on the page image and select that story. The story text file associated with the selected story will be loaded and the story displayed in a clear text format as illustrated in FIG. 3. When the selection is made the page number associated with the page image file currently being viewed is known, and the location of the cursor within the page image when the selection was made is known. The display of the selected story is equivalent to searching the RECORDS to select the one which is associated with the correct page number and which has a POINTER in its fifth field pointing to the story position file defining the area in which the cursor was positioned when the selection was made, and displaying the text data and other information of the selected RECORD on the VDU.

Once the text data have been extracted and the text passages have been assigned page and story numbers, a list of the contents of the publication and a series of links from each of the entries in the list of contents to the relevant page image file can be generated using digital processing. Each entry in the list forms part of a control item, the other part being a link to the page image file representing the page on which the headline entry appears. Selection of an entry on the contents list by pointing and clicking the headline entry activates the control item which uses the link to retrieve and display the image of the page on which the headline appears. In the information display system output, the contents list can be called up for display on the left side of the screen simultaneously with a page image on the right side of the screen (see FIG. 2), to serve as a guide to users of the contents on the current page and on the preceding and succeeding pages of the publication. Each entry in the list is a selectable "icon" forming a link to the page on which the entry appears.

An example of a program for generating a contents list is given in Appendix 1. The contents list is generated from the text headlines or subheadings associated with the stories ordered by page numbers and story numbers. The generated headline index file is output for use in generating the simultaneous text/image displays for the given publication ("London Evening Standard Business Day" in this example).

Figure 11:
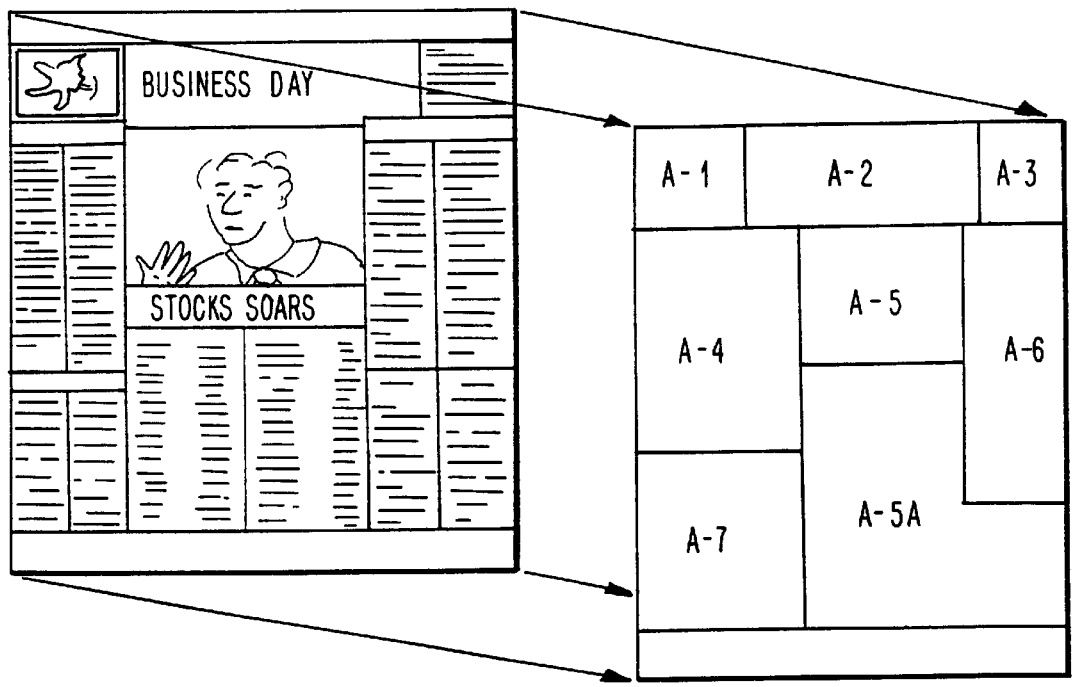
FIG. 11 illustrates the use of image maps to navigate to the text passage on a page image containing the imaged article.

As shown in FIG. 11, the text passages (text stories) are linked by image maps IMx to the locations A-i of the corresponding stories on the page images. Each of the locations A-i of the story areas on the page images is similar to an icon in that it forms, parts of a control item, the other part being a link to the corresponding text passage (story). Clicking on a story area activates a control item which uses the link to retrieve and display the text file corresponding to the story in the selected story area. In the information display system output, the text passage can be called up for display on the left side of the screen simultaneously with display of the page image with story highlighted on the right side of the screen (see FIG. 3), to allow users to view the text in detail and interact with any linkages therein together with the contextual and editorial cues provided by the page image.

Image maps are used so that the story area acts like an icon or selectable button, i.e, a text passage is called up by a user clicking on the story area and the text passage is retrieved in response to its linkage on the associated image map for the page image.

The image maps can be created using, for example, mapping software such as one designated Web Map, which is available as shareware and stored as digital image map files. Typically, a rectangle or other shape is overlaid on the processed image by an operator who links the pixels within the shape on the image map template with a page number and story number in the database. The can be done by indexing the text fie to the pixel group using a corresponding file naming convention, e.g., a "P1S2" suffix for the text file corresponding to the article area delineated on page #2 as story #2. The text files are read into the database which then stores the coordinates of the pixels contained in the map file with the record for that story. It does this by using the file name to identify the corresponding record in the database, in this case, the text record for page #1, story #2. A field in the database is updated to contain the indexing information.

The input data conversion process can include the extraction of other pictures and graphics appearing in the page images which are related to the text passages, or of cartoons, advertisements, and other graphics which may be desirable to display in their own right simultaneously with the page images. The graphics images are extracted from the EPS or PDF files into individual graphics files using standard graphics editing tools, e.g., the Adobe illustrator™ system. Graphics related to the stories, such as a photo of the subject of a story or a headshot of a contributing columnist, are indexed in the database to the stories by page numbers and story numbers. Besides extracting the Postscript images in the manner described above, sufficient quality can also be obtained by using "screen dumps" of the page makeup files themselves and separating the bit-mapped components. This can be achieved, for example, using the Adobe Photoshop™ system. Standalone graphics can be linked to their locations in the page images using a control item and the image mapping described above.

In the information system display output, story-related graphic images appearing in the page images can be retrieved, manipulated, and displayed on the left side of the screen in a window adjacent to the text passage (see FIG. 6). Standalone graphic images can be called up for display on the left side of the screen by a mouse click, or can be used to trigger an external retrieval process resulting in display of a linked graphics file, such as an advertisement (the "Dell" logo linked to the advertisement in FIG. 7), an externally retrieved output (the up-to-date stock performance graph in FIG. 5), or the display of an associated text passage.

The extracted text data, list of contents, image maps, and extracted graphic images are stored in the database along with the processed page images. The database thus contains an ordered, structured, and mapped version of all text and related graphics components linked to their positions in the page images.

Generating a List of Identified Words

A list of important identifier words appearing in the pages of the publication can also be generated from the extracted text data. Important identifier words can include the names of companies, important persons, well-known products, media programs, etc., which are reported on in the publication. In the information display system output, a list of company names reported on in the publication can be called up for display on the left side of the screen (see FIG. 4). A click or entry of a selected company name will result in a display of the page image and highlighted story in which the company name appears on the right side of the screen, and the corresponding text passage on the left side of the screen (see FIG. 6). Similarly, display of a text passage with important company names highlighted therein allows a user to click on the highlighted name or word and call up another display of further information on the company.

Keywords are often designated in text by the publisher, for example, using specialized type fonts such as using bold font for company names or using italics for author's names or publication references. This designation in the text constitutes format data and provides a convenient way to identify keywords from the publisher's input. As an example, company names in the input from the publisher are highlighted by tags for bold type font. Thus, a list of company names can be generated using a digital processor to parse the digital text data and extracting the names delimited by the bold tags into a company index file. The company names on the list are then indexed to the page numbers and story numbers where they appear in the page images, as well as by their text positions as delimited by the bold tags in the text passages. Each keyword text position is consequently indexed to a page number and a story number, and a link is formed between the text most on and the story (text and/or image) in which the keyword appears. The text position and link form a control item which is activated by clicking on the text position. Activation of the control item causes the story to be retrieved and displayed. Indexing by their text positions allows the company names to be highlighted in the text displays and defined as control items having anchors for interactive linkages to further information during the system authoring stage. The resulting company index file is stored in the database for the simultaneous text/image information display system. The company names may also be added to a company name library list which is cumulated over time. In this manner, extensive keyword lists can be developed, and may be used for alternative methods to automated parsing of keywords.

Figure 10:
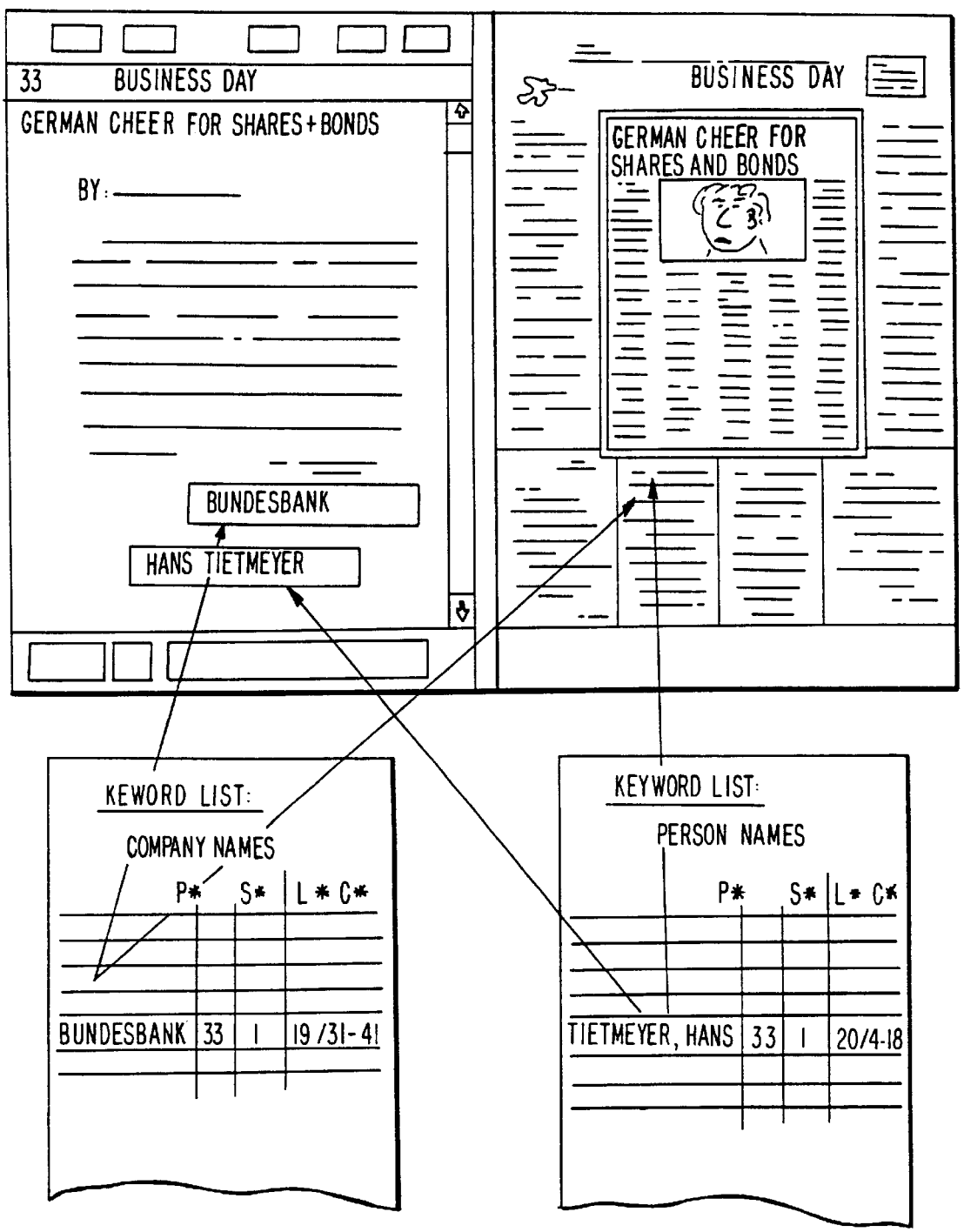
FIG. 10 illustrates the use of keyword lists to navigate to the text passage and page image containing the keywords.

One alternative method for generating the list of important identifier words (keywords) is to use a digital processor to search for text strings in the extracted digital text data which match entries in stored library lists of known company names, important person names, product names, media names, etc. The library lists can be updated from the electronic files processed and/or by manual input of an operator when a new keyword is recognized. When important identifier words are identified in the text passages, the digital processor adds the names to the keyword list, indexes the names to their page numbers and story numbers indicates the names to the positions of the words in the text passages, and creates a link between the name and the story in which the name appears. Keywords can also be added manually to the keyword list by the operator. The keyword lists serve as a powerful method of navigation to the covering stories in the simultaneous text/image information display system. FIG. 10 illustrates the selection of a keyword in a keyword list to navigate to the text passage and page image containing the keywords. The image maps also provide the ability to navigate among stories on a page and call up the corresponding text passages by clicking on the mapped areas of the stories.

Enhancing Visual Quality Of Page Images

Along with the above, the page images are processed by processing the encapsulated postscript files of the publisher's input files to form 72 dpi bit-mapped page images or any other resolution appropriate to the intended output medium. The internet, for example, usually requires images in GIF (Graphic Interchange Format) where the file sizes are minimized to enhance the speed of download. Optimized palettes are used to also minimize file size and increase visual quality. The image files are manipulated using bit-map processing software, such as Adobe Photoshop™ or Debabaliser™ software, to produce page images that are visually enhanced and/or data compressed to be acceptable in quality and reasonably small in file size. Scripts can be written to batch process the EPS or PDF files into appropriate page image files in a completely automated process. These scripts call a set of routines commonly used in image manipulation software such as Photoshop™ or Debabaliser™ software.

Linking Identified Information with Further Data

Further information is stored in the database by establishing indexes to its parent page/story number. "Regular" features, e.g., where the same page/story is always written by the same author, and may include a picture of the author, can be added automatically as a default by the database. Others are identified by an operator who may use a pull down menu of regular features or may insert the name manually. The naming convention of "P1S2G3" may be used typically indicating the graphics #3 connected to page #1, story #2.

A typical picture or graphic image would appear somewhere before the main body of text. Its position is indicated in the database by a number which instructs the database to output the link to this item after the appropriate numbered text item. Where a picture/graphic element is desired to be presented within the main body of the text, a convention of "[n]" (number within square brackets) may be used for the graphics number to instruct the output stage of the database to substitute this sequence for the appropriate longer form of the graphics name. This is designed to avoid operator error in miskeying longer sequences of characters than necessary in these manual operations.

Linkages to external data sources, i.e., external to the original publication, is typically achieved by linking to a predetermined set of hooks in the database. For example, a share price for a company identified by the keyword indexing process can be obtained using the official company name or stock exchange symbol stored in the database. After looking up the unique identifier name in the database, the system performs a share price lookup procedure with an external data source, and returns the retrieved share price for use in the display system.

Output of Information System Display to User

When the conversion of the publisher's input data in the database has been completed, a software routine in the display system creates a sequence of files containing the desired sequence and style of displays, linkages to both internal and external data, and other interactive functions for the information display system, as illustrated in Appendix 1. The linkages between story areas and related graphic images, text passages, keywords in the text passages, and image maps for the page images defined in the data conversion stage are used to define display buttons, highlighted stories, highlighted words, and linked displays in the display authoring stage. In accordance with the invention, examples of displays of text passages simultaneously with the page images providing contextual cues for the text passages to the viewer are shown in FIGS. 2–6. The resulting processed files constitute a digital data structure viewable using Web browsing software such as Netscape™ Navigator or Microsoft™ Internet Explorer on a file server running server software such as Novell™ Netware, Appleshare™, or Windows NT™ Server software. The digital data structure can also be uploaded onto a Web server running Netscape™ Server, Microsoft™ Information Server, or Apache™ server software. Once in the database, given the structuring of the data as described, the created files can be converted to a digital data structure in one of many possible formats and stored in a memory.

The Web-viewable files (digital data structure) are transmitted from the memory of the processing unit 10 to an intended server using suitable transmission software which first identifies files as either new or unchanged from a previous transmission. The Web-viewable files (digital data structure) are stored in a memory in the intended server. If the files are changed, they are compressed into a single file and transmitted over ISDN, PSTN, or leased line to the receiving server. The receiving server unpacks the compressed file into its components and copies them into the appropriate place on the user's server. This approach is used for efficiency where multiple destination types may be required. It does not matter whether the user's server is a true file server or whether it is a Web server. The transmission software can also be configured to compress all data all of the time. Alternate software routines, such as the "TAR" function used in the UNIX™ operating system, can be used to combine all files for transmission to a remote server. A simple UNIX™ script can be used to scan for these files and decompress them with the "UNTAR" function and copy them to the appropriate directory.

In an information display system configured for an intranet as shown an FIG. 1, each user is provided with a personal computer linked to a central file server to provide the necessary information. The personal computer can be a Macintosh System 7 with a 256 colour video screen or an IBM (Registered Trade Mark) compatible 486 based computer having at least 8 M Bytes of RAM and a 256 colour video screen. The information display system may also be configured as a server for the internet to which a universe of users and server nodes may have access.

The server database for the in information display system of the invention has the display content assembled into formats suitable for the medium to which it is targeted. For example, HTML is usually used where the output medium is the World Wide Web. However, the database can also process the system output files in other structured formats, for example, the Bloomberg™ real-time display system. The common principle is that the linkages between text passages, keywords, graphics, and page images are ordered based upon their assigned priorities and/or locations on the page images.

In addition to the solution of providing simultaneous displays for communicating familiar visual contextual and editorial information to the reader of text passages in the publication, the provision of the system output files in a readily viewable HTML format provides certain other advantages over simply viewing the publisher's publication file in PDF format with a plug-in or ocher formats not supported on the internet currently. A PDF file is published as a single large file. Although there are advanced download technologies available, a PDF file typically takes longer to download than an HTML file, which contains many smaller files. An HTML file is also simpler to edit, integrates seamlessly with other Web technologies, and can provide access to further information from other active processes and databases dynamically.

The information display system of the present invention may be modified and extended in other ways. For example, since the text data are extracted from the publisher's input and maintained in the system database, the text data can be readily searched by any search engine to find target stories, names, and references and to retrieve the publication pages containing them. The processed information in the form of the prioritization of stories by importance and keyword lists can be used to assist with conducting high quality searches with high efficiency. Thus, the published issues can be converted to a data resource that is fully accessible and searchable by external users.

The processing of publishers input into system output files and authoring of linkages between text passages, keywords, graphics, and page images can be developed further for fully automated processing. Batch processing scripts can be developed for automatedly extracting text data, graphics images, and keywords, generating image maps, and updating system library files. Stories may be tagged in the database in such a way that advertisements handled by the system will be changed as different stories are selected. This would allow customizing of advertising opportunities by associating different story types with different advertisements.

The processed information obtained in the present invention may also be used in other ways to provide further advantages. For example, the image maps defining the story areas for the page images may be used with the original PDF files to provide the capability for enhanced functions. The image map can be overlaid on the PDF file itself and by a click allow simultaneous viewing of the chosen text similar to the display result described previously. Additionally, the PDF file can retain zoom capabilities inherent in the file reader software. Clicking on the story area of an image map can be used to trigger an internal process, such as zooming in or out on a page view, or an external process, such as connecting to a related database of supporting information.

If the headlines are too small to read on a given display of a bitmapped page, a mouse roll-over can pull up headlines or captions in a pop-up box. Another possibility is to create a floating window which contains the page image. This could develop into an information tool, taking advantage of push technologies and broadcast methodologies using the JAVA language as its development platform rather than HTML, wherein a click can pull up a simultaneous display of background material in another display window.

It should be understood that the foregoing description of the present invention is meant to be illustrative only. While a few examples of the present invention have been described in detail, the principles of the present invention may be adapted to many different variations without departing from the spirit of the invention.

APPENDIX 1

Main Output Routine

```
CLF:=Char(13)+Char(10)
CR:=Char(13)+Char(10)
QU:=Char(34)
$tmp:=""
v_inpic:=False
href_b:="<A href="
href_e:="</A>"
a_center:="<CENTER>"
end_center:="</CENTER>"
ALL RECORDS([LivePaths])
ImagePath:=[LivePaths]path_image  ` relative to the edition!
StaticPath:=[LivePaths]path_static  ` relative to the edition!
IndexPath:=[LivePaths]path_index  ` relative to the edition!
b_homehtm:=IndexPath+"index.htm"  ` relative to the edition!

h_bushelp:="bushelp.htm"  `business section help
h_newshelp:="newshelp.htm"  `news section help
h_help:=StaticPath+"help.htm"
b_helpgif:=StaticPath+"buthelp.gif"

b_homegif:=StaticPath+"buth.gif"
b_idxgif:=StaticPath+"buti.gif"
b_fidxgif:=StaticPath+"fbuti.gif"
  `story buttons
b_nextgif:=StaticPath+"butsn.gif"
b_prevgif:=StaticPath+"butsp.gif"
b_fnextgif:=StaticPath+"fbutsn.gif"
b_fprevgif:=StaticPath+"fbutsp.gif"
  `page buttons
b_updpggif:=StaticPath+"butpg.gif"
b_pnextgif:=StaticPath+"butpn.gif"
b_fpnextgif:=StaticPath+"fbutpn.gif"
b_pprevgif:=StaticPath+"butpp.gif"
b_fpprevgif:=StaticPath+"fbutpp.gif"
  `section navigation buttons
b_bdgo2gif:=StaticPath+"butbd2.gif"
b_esgo2gif:=StaticPath+"butes2.gif"
b_bdgo:=StaticPath+"butbd.gif"
b_esgo:=StaticPath+"butes.gif"
b_nobdgo:=StaticPath+"tbutbd.gif"
b_noesgo:=StaticPath+"tbutes.gif"
b_logo:=StaticPath+"bdilogo.gif"
b_noactad:=StaticPath+"bdiad.gif"
b_actad:=StaticPath+"bdiad.gif"

OPEN WINDOW(100;100;415;286;-5;"Generate BDI - WWW")
DIALOG([Stories];"WWWChoose")
CLOSE WINDOW If (OK=1)
 ALL RECORDS([Masters])
 ALL RECORDS([WWWcomponent])
 top_hdr:=[WWWcomponent]StoryHdr
 body_hdr:=[WWWcomponent]BodyHdr
```

APPENDIX 1

Main Output Routine

```
$thePath:=[Masters]BDIgenoutWWW
$indexPath:=[Masters]BDIgenoutINDEX
v_mainshare:=[Masters]BDIdefaultshare
  `reads in $tmplatepath and $rawPath inside the w_story routine
  `which deals with the Market Prices section SEARCH([Stories];[Stories]ST_Date=v_datesetup;*)
SEARCH([Stories]; & [Stories]ST_Paper=v_paper;*)
SEARCH([Stories]; & [Stories]ST_Edition=v_edition)
  ` need everything for the contents
Case of
  : (bBus=1)
    `first of all create the index files index and mindex etc
    $return:=w_archive ($indexPath)
    `=================
    SEARCH SELECTION([Stories];[Stories]ST_Cat_Bus=True)
    v_bdcon:="bdcon.htm"
    v_strip:="bdstrip.htm"
    v_frame:="bdframe1.htm"
    h_conhelp:=h_bushelp
    v_altframe:="esframe1.htm"
      `write out bdstrip
      `this is not now needed as it is static
      `=======
    ` $return:=w_stripfile ($thePath;v_strip;b_esgo;
    `v_altframe;b_nobdgo;b_actad;b_noactad;b_logo)
    `=======
    `v_mktprices is chosen from the stories dbase
    `v_glance as above
  Else
    v_bdcon:="escon.htm"
    v_strip:="esstrip.htm"
    v_frame:="esframe1.htm"
    h_conhelp:=h_newshelp
    v_altframe:="bdframe1.htm"
      `write out esstrip
      `this is not now needed as it is static
      `=======
    `  $return:=w_stripfile ($thePath;v_Strip;b_bdgo;v_altframe
    `;b_noesgo;b_actad;b_noactad;b_logo)
      `=======
    SEARCH SELECTION([Stories];[Stories]ST_Cat_Bus=False)
` does the rest
End case
b_idxhtm:=v_bdcon
$doc2:=""
$docframe:=""
SORT SELECTION([Stories];[Stories]ST_PageReal;>;[Stories]ST_Number;>)
CREATE SET([Stories];"StorySet")
FIRST RECORD([Stories])
$totalstory:=Records in selection([Stories])

`write in header and button defs date edition etc!
  b_pghtm:="p"+String([Stories]ST_PageReal)+".htm"
`pulls in first from whichever section here
  b_firstpg:=b_pghtm
```

APPENDIX 1                                               1-3

Main Output Routine

```
b_firsthtm:="p"+String([Stories]ST_PageReal)+"s"+String([Stories]ST_Number)+".htm"
 $doc2:=w_contenthdr (b_pghtm;b_firsthtm)
 $docframe:=w_framehdr (b_pghtm;b_firsthtm;v_bdcon;v_strip)
 Case of
   : (bBUS#1)
     $tmp:="<CENTER><B>TOP NEWS & SPORT INDEX</B>"+CR+"<HR NOSHADE SIZE=1><FONT SIZE=2>"+CR
     ` $tmp:=$tmp+w_button (b_bdgo2gif;v_altframe;"_top";"<HR>"+CR)
     $tmp:=$tmp+w_textbutton ("<B>Business Day</B>";v_altframe;"_top";"</FONT></CENTER><P>")
     $doc2:=$doc2+$tmp
     $docframe:=$docframe+$tmp
   Else
     $tmp:="<CENTER><B>"+w_name ("index";"BUSINESS DAY INDEX</B>";"<BR>")
     ` $tmp:=$tmp+w_button (b_esgo2gif;v_altframe;"_top";"<BR>")
     $tmp:=$tmp+"<HR NOSHADE size=1><FONT SIZE=2>"+CR
     $tmp:=$tmp+w_generallink ("Company Index";"#company";" | ")
     $tmp:=$tmp+w_generallink ("Messages";"#msg";" | ")
     $tmp:=$tmp+w_textbutton ("At a Glance";v_glance;"story";" | ")
     $tmp:=$tmp+w_textbutton ("Market Prices";v_mktprices;"story";" | ")
     $tmp:=$tmp+w_textbutton ("<B>Top news & sport</B>";v_altframe;"_top";"</FONT></CENTER><P>")

$doc2:=$doc2+$tmp
     $docframe:=$docframe+$tmp
 End case
 If (OK=1)
   $pageref:=""
   $oldpageref:=""
   $prepage:=""
   SELECTION TO ARRAY([Stories]ST_PageReal;RealPage;[Stories]ST_Number;StoryNumber)
     `find out how many pages!
     ARRAY INTEGER(pageactual;Size of array(RealPage))

$totalpages:=0
   $pagecount:=0
     `pageactual is an array containing ONLY the different pages no the pages for each
     `see also w_closemap for its use
   For ($i;1;Size of array(RealPage))
     If (RealPage{$i}#$pagecount)
       $totalpages:=$totalpages+1
       pageactual{$totalpages}:=RealPage{$i}
       $pagecount:=RealPage{$i}
     End if
   End for
   $pagecount:=0 ` use this again below
   USE SET("StorySet")
   SORT SELECTION([Stories];[Stories]ST_PageReal;>;[Stories]ST_Number;>)
   FIRST RECORD([Stories])
   For ($loop;1;$totalstory)

$return:=w_story ($thePath;$loop;$totalstory)
     $pageref:="Page "+String([Stories]ST_PageReal)
     If ($pageref#$oldpageref)
```

APPENDIX 1

Main Output Routine

```
  If ($oldpageref#"")
    $return:=w_closemapfile ($pagecount;$totalpages)
  End if  `except for first close the old on ebefore the new one is opened
  $pagecount:=$pagecount+1
  b_pghtm:="p"+String([Stories]ST_PageReal)+".htm"
  i_pggif:=ImagePath+"p"+String([Stories]ST_PageReal)+".gif"
  m_pgmap:="p"+String([Stories]ST_PageReal)+"map"
  $tmp:=$prepage+w_textbutton
("<B>"+$pageref+"</B>";b_pghtm;"page";"<CITE> - page view</CITE>"+"<UL>")
  $doc2:=$doc2+$tmp
  $docframe:=$docframe+$tmp
  vdoc3:=Create document($thePath+b_pghtm)
  $mapdef:="<MAP NAME="+Char(34)+m_pgmap+Char(34)+">"
  SEND PACKET(vdoc3;top_hdr+CR)
  SEND PACKET(vdoc3;body_hdr+CR)
  SEND PACKET(vdoc3;$mapdef+CR)
  $oldpageref:=$pageref
  $prepage:="</UL>"+CR+CR
  End if b_storyhtm:="p"+String([Stories]ST_PageReal)+"s"+String([Stories]ST_Number)+".
htm"
  $tmp:="<LI>"+w_textbutton (p_charbycharout
([Stories]ST_Headline);b_storyhtm;"story";"")

$doc2:=$doc2+$tmp
  $docframe:=$docframe+$tmp
  $maptype:=""
  Case of
    : ([Stories]ST_rect=True)
      $maptype:="RECT"
    : ([Stories]ST_poly=True)
      $maptype:="POLY"
  End case
  SEND PACKET(vdoc3;w_arearect
([Stories]ST_MAP;b_storyhtm;"story";"";$maptype))
  NEXT RECORD([Stories])
  End for  `loop
  `finish off the page file   on last page $return:=w_closemapfile ($pagecount;$totalpages)
  $doc2:=$doc2+"</UL>"+CR
  $docframe:=$docframe+"</UL>"+CR
  If (bBUS#1)
    ` end of top news
    $tmp:="<HR NOSHADE SIZE=1>"+CR+"<CENTER>"+CR+"<FONT
SIZE=2>"
    $tmp:=$tmp+w_textbutton ("Help";h_newshelp;"story";" | ")
    $tmp:=$tmp+w_textbutton ("Home";b_homehtm;"_top";" | ")
    $tmp:=$tmp+w_textbutton ("Index";v_bdcon;"story";" | ")
    $tmp:=$tmp+w_textbutton ("Page View";b_firstpg;"page";" | ")
    $tmp:=$tmp+"Previous Story | "
    $tmp:=$tmp+w_textbutton ("Next Story";b_firsthtm;"story";"")
    $tmp:=$tmp+"</FONT></CENTER></BODY></HTML>"+CR
    $doc2:=$doc2+$tmp
    $docframe:=$docframe+$tmp
  End if  `only put this out here on NEws and Spoirt
End if  `creation of HEadline.idx was ok
```

APPENDIX 1

Main Output Routine

```
`output company index
If (bBus=1)
  SEARCH([Companies];[Companies]Co_Date=v_datesetup;*)
  SEARCH([Companies]; & [Companies]Co_Edition=v_edition)
  SORT SELECTION([Companies];[Companies]Co_Name)
`=========
  $tmp:="<CENTER><B>"+w_name ("company";"Companies referred to in this edition</B>";"")
  $tmp:=$tmp+"<HR NOSHADE size=1><FONT SIZE=2>"+CR
  $tmp:=$tmp+w_generallink ("Index";"#index";" | ")
  $tmp:=$tmp+w_generallink ("Messages";"#msg";" | ")
  $tmp:=$tmp+w_textbutton ("At a Glance";v_glance;"story";" | ")
  $tmp:=$tmp+w_textbutton ("Market Prices";v_mktprices;"story";" | ")
  $tmp:=$tmp+w_textbutton ("<B>Top news & sport</B>";v_altframe;"_top";"</FONT></CENTER><P>")
  $doc2:=$doc2+$tmp
  $docframe:=$docframe+$tmp For ($loop;1;Records in selection([Companies]))
    SEARCH([Stories];[Stories]ST_Parent=[Companies]Co_UniqNo)
    If (Records in selection([Stories])#1)
      ALERT("Error in "+[Companies]Co_Name+" in company index - No Story ref "+String([Companies]Co_UniqNo))
    Else b_storyhtm:="p"+String([Stories]ST_PageReal)+"s"+String([Stories]ST_Number)+".htm"
      $tmp:=w_textbutton ([Companies]Co_Name;b_storyhtm;"story";"<BR>")
      $doc2:=$doc2+$tmp
      $docframe:=$docframe+$tmp
    End if `only one story selected
    NEXT RECORD([Companies])
  End for
`=========
  $tmp:="<CENTER><B>"+w_name ("msg";"Business Day Messages</B>";"")
  $tmp:=$tmp+"<HR NOSHADE size=1><FONT SIZE=2>"+CR
  $tmp:=$tmp+w_generallink ("Index";"#index";" | ")
  $tmp:=$tmp+w_generallink ("Company Index";"#company";" | ")
  $tmp:=$tmp+w_textbutton ("At a Glance";v_glance;"story";" | ")
  $tmp:=$tmp+w_textbutton ("Market Prices";v_mktprices;"story";" | ")
  $tmp:=$tmp+w_textbutton ("<B>Top news & sport</B>";v_altframe;"_top";"</FONT></CENTER><P>")
  $doc2:=$doc2+$tmp
  $docframe:=$docframe+$tmp
  `at this point there should be messages ouput hence the wrting out of $tmp at thi
`==========messages `==== end of messages
  $tmp:="<HR NOSHADE SIZE=1>"+CR+"<CENTER>"+CR+"<FONT SIZE=2>"
  $tmp:=$tmp+w_textbutton ("Help";h_bushelp;"story";" | ")
  $tmp:=$tmp+w_textbutton ("Home";b_homehtm;"_top";" | ")
  $tmp:=$tmp+w_textbutton ("Index";v_bdcon;"story";" | ")
  $tmp:=$tmp+w_textbutton ("Page View";b_pghtm;"page";" | ")
  $tmp:=$tmp+"Previous Story | "
  $tmp:=$tmp+w_textbutton ("Next Story";b_firsthtm;"story";"")

$tmp:=$tmp+"</FONT></CENTER></BODY></HTML>"+CR
```

APPENDIX 1

Main Output Routine

```
  $doc2:=$doc2+$tmp
  $docframe:=$docframe+$tmp

End if  `bBUS=1

`output all
vdoc2:=Create document($thePath+v_bdcon)
vdocframe:=Create document($thePath+v_frame)
SEND PACKET(vdoc2;$doc2)
SEND PACKET(vdocframe;$docframe)
CLOSE DOCUMENT(vdoc2)
CLOSE DOCUMENT(vdocframe)
  `end of output all BEEP
End if  `ok from dialog
```

1-6

APPENDIX 1

Individual Story Routine

```
`$1=$thePath
`$2 is the looop
`$3 is the total stories b_pghtm:="p"+String([Stories]ST_PageReal)+".htm"
If ($2<$3)
  b_nexthtm:="p"+String(RealPage{$2+1})+"s"+String(StoryNumber{$2+1})+".htm"
Else
  b_nexthtm:=v_bdcon `why not go round full circle back to index?
End if If ($2>1)
  b_prevhtm:="p"+String(RealPage{$2-1})+"s"+String(StoryNumber{$2-1})+".htm"
Else
  b_prevhtm:=v_bdcon `why not go round full circle back to index?
End if $filename:="p"+String([Stories]ST_PageReal)+"s"+String([Stories]ST_Number)+".htm"
vdoc:=Create document($1+$filename)
If (OK=1)
  $tmp:=top_hdr+CR
  $tmp:=$tmp+body_hdr+CR
  $tmp:=$tmp+a_center+CR
  $tmp:=$tmp+w_button (b_helpgif;h_conhelp;"story";"")
  $tmp:=$tmp+w_button (b_homegif;b_homehtm;"_top";"")
  $tmp:=$tmp+w_button (b_idxgif;b_idxhtm;"story";"")
  $tmp:=$tmp+w_button (b_updpggif;b_pghtm;"page";"")

If (b_prevhtm="")
    $tmp:=$tmp+w_button (b_fprevgif;"";"";"")
  Else
    $tmp:=$tmp+w_button (b_prevgif;b_prevhtm;"story";"")
  End if If (b_nexthtm="")
    $tmp:=$tmp+w_button (b_fnextgif;"";"";"<BR>")
  Else
    $tmp:=$tmp+w_button (b_nextgif;b_nexthtm;"story";"<BR>")
  End if `define the actual body copy
  edition:=w_edition   ` gets date etc stuff
  Case of
    : ($filename=v_mktprices)
      $tmplatePath:=[Masters]BDIsharetmplate
      $rawPath:=[Masters]BDIshareRawIn
      Indoc:=Open document($tmplatePath+v_mainshare)
      $tmp:=$tmp+"<FONT SIZE=2>Business Day - "+v_edtime+" MARKET PRICES</FONT></CENTER><P>"+CR
      Repeat `until EOF
        RECEIVE PACKET(Indoc;$textbuffer;32000)
        $tmp:=$tmp+$textbuffer Until (Length($textbuffer)=0)  ` i.e. to end of file (should only be one pass!)
      CLOSE DOCUMENT(Indoc)
```

APPENDIX 1

Individual Story Routine

```
` rawdoc:=Open document($rawPath+v_mainshare+".htm")
` Repeat `until EOF
` RECEIVE PACKET(rawdoc;$textbuffer;32000)
` $tmp:=$tmp+$textbuffer
`Until (Length($textbuffer)=0) ` i.e. to end of file (should only be one pass!)
`CLOSE DOCUMENT(rawdoc)
  $tmp:=$tmp+"</TD></TR></TABLE>"+CR
Else
  $tmp:=$tmp+edition
  ` $tmp:=$tmp+" - P"+String([Stories]ST_PageReal)+CR
  $tmp:=$tmp+end_center+CR
  v_headline:=[Stories]ST_Headline
  v_strapline:=[Stories]ST_Strap
  If ((v_headline="") & (v_strapline#""))
    v_headline:=v_strapline
    v_strapline:=""
  End if ` $tmp:=$tmp+w_addgraphic (1)
  If (v_strapline#"")
    $tmp:=$tmp+"<H3>"+p_charbycharout (v_strapline)+"</H3>"+CR
  End if ` $tmp:=$tmp+w_addgraphic (2)
  If ((v_headline#"") & ([Stories]HeadlineSuppres=False))
    $tmp:=$tmp+"<H1>"+p_charbycharout (v_headline)+"</H1>"+CR
  End if ` $tmp:=$tmp+w_addgraphic (3)
  If ([Stories]ST_Subhead#"")
    $tmp:=$tmp+"<H2>"+p_charbycharout ([Stories]ST_Subhead)+"</H2>"+CR
  End if ` $tmp:=$tmp+w_addgraphic (4)
  If ([Stories]ST_Byline#"")
    $tmp:=$tmp+"<CITE>"+p_charbycharout
([Stories]ST_Byline)+"</CITE><P>"+CR
  End if ` $tmp:=$tmp+w_addgraphic (5)
  If ([Stories]ST_Text_Clean#"")
    $tmp:=$tmp+p_charbycharout ([Stories]ST_Text_Clean)+CR
  End if End case ` ends the special part for Market prices
$tmp:=$tmp+"<BR><FONT SIZE=2>©Associated Newspapers
1996</FONT>"
  `define the text buttons on the bottom
$tmp:=$tmp+a_center+"<HR NOSHADE SIZE=1>"+CR
$tmp:=$tmp+"<FONT SIZE=2>"
$tmp:=$tmp+w_textbutton ("Help";h_conhelp;"story";" |")
$tmp:=$tmp+w_textbutton ("Home";b_homehtm;"_top";" |")
$tmp:=$tmp+w_textbutton ("Index";b_idxhtm;"story";" |")
$tmp:=$tmp+w_textbutton ("Page View";b_pghtm;"page";" |")
If (b_prevhtm="")
  $tmp:=$tmp+w_textbutton ("Previous Story";"";"";" |")
Else
  $tmp:=$tmp+w_textbutton ("Previous Story";b_prevhtm;"story";" |")
```

APPENDIX 1

Individual Story Routine

```
End if
If (b_nexthtm="")
 $tmp:=$tmp+w_textbutton ("Next Story";"";"";"")
Else
 $tmp:=$tmp+w_textbutton ("Next Story";b_nexthtm;"story";"")
End if `define the footer info for html
$tmp:=$tmp+"</FONT>"+CR
$tmp:=$tmp+end_center $tmp:=$tmp+"</BODY>"+CR
$tmp:=$tmp+"</HTML>"+CR SEND PACKET(vdoc;$tmp)
CLOSE DOCUMENT(vdoc)
Else
 ALERT("Error creating "+$filename+" in "+$1)
 OK:=0
End if
$0:=OK
```

APPENDIX 2

```
/****************************************************
 *
 * Project : lesindex
 * File Name: lesindex.c
 * Abstract:
 Process Pagespeed files in order to extract and index company names and
 headlines from the newspaper stories, and to perform character mappings if
 necessary.
 Output is in a format suitable for London Evening Standard Business Day
 Interactive implemented by Infosis to be imported into Macromedia Director.
 * Revision:   1.0
 * Date:       10/10/94
 *
 * Author:    Mischka Hughes
 *
 * Audit Trail
 *    Rev 1.00 10/10/94 Initial Revision
 *
 ****************************************************
 *
 * All rights reserved. No reproduction, copy or transmission of
 * this program (in source form, compiled form or any other form)
 * and any of the files associated with it, may be made without
 * written permission from the author.
 * No sub-section of this program (in source form, compiled form or
 * any other form) and any of the files associated with it, may
 * be reproduced, copied or transmitted save with written permission
 * from the author, or in accordance with the provisions of the
 * Copyright Act 1956 (as amended).
 * Any person who does any unauthorised act in relation to this
 * program (or the associated files) may be liable to criminal
 * prosecution and civil claims for damages.
 *
 *
 * (C) Infosis 1994
 *
 ****************************************************/ include <stdio.h>
include <fcntl.h>
#include <stdlib.h>
#include <search.h>
#include <ctype.h>
#include <dir.h>
include <string.h> define COMPANY_IDX   "company.idx"
define HEADLINE_IDX  "headline.idx"

#define MARKET_REPORT    "M A R K E T  R E P O R T"
#define ANALYSIS         "A N A L Y S I S"

define CONTROL      0x07 define PS_APPOS     0xd5
```

```
define PS_THIN_SP      0x1a define MAC_THIN_SP     0xCA
define MAC_OP_APPOS    0xD4
#define MAC_CL_APPOS    0xD5
#define MAC_OP_D_QUOTE  0xD2
define MAC_CL_D_QUOTE  0xD3 define LINE_END        "\r\n"

define MAX_COMPANY_NAME_LEN    100 char **arglst;

FILE    *infile;
FILE    *outfile;
FILE    *c_idx_fp;
FILE    *h_idx_fp;
int     p_no;
int     story_no;

char    buf[3000];
char    str_buf[3000];
char    hl_buf[3000];

int     buf_pos=0;
int     str_buf_pos=0;
int     hl_buf_pos=0;
int     hl_len;

void buf_add(ch)
{
 buf[buf_pos++]=ch;
} void buf_end()
{
 buf[buf_pos]='\0';
 buf_pos=0;
} void hl_buf_add(ch)
{
 if (ch==PS_THIN_SP) hl_buf[hl_buf_pos++]=' ';
 else hl_buf[hl_buf_pos++]=ch;
} void hl_buf_end()
{
 hl_buf[hl_buf_pos]='\0';
 hl_buf_pos=0;
} void str_buf_add(ch)
{
```

```
    if (ch==PS_THIN_SP) str_buf[str_buf_pos++]=' ';
    else str_buf[str_buf_pos++]=ch;
} void str_buf_end()
{
  str_buf[str_buf_pos]='\0';
  str_buf_pos=0;
} void append_to_index()
{
  int len;
  char *ch;

len=strlen(str_buf);
  if (len==0) return;
  len--;
  // strip trailing non-alpha chars
  while (len!=0 && !isalpha(str_buf[len])) {
    str_buf[len]='\0';
    len--;
  }
  ch=str_buf;
  // skip leading non-alpha chars
  while (*ch && !isgraph(*ch)) ch++;
  if (!ch) return;
  // if is lower then not a company name .
  if (islower(*ch)) return;
/*
  // dot-dot routine for ling lines
  if (strlen(ch)>MAX_COMPANY_NAME_LEN) {
    ch[MAX_COMPANY_NAME_LEN]='\0';
    ch[MAX_COMPANY_NAME_LEN-1]='.';
    ch[MAX_COMPANY_NAME_LEN-2]='.';
  }
*/
//  fprintf(c_idx_fp,"%d       %s%s",p_no,ch,LINE_END);

// specific headline alterations
  if (strncmp(hl_buf,MARKET_REPORT,strlen(MARKET_REPORT))==0) {
    fprintf(c_idx_fp,"%s - MARKET REPORT%*sp%ds%d *%s"
       ,ch,100,"",p_no,story_no,LINE_END);
  }
  else if (strncmp(hl_buf,ANALYSIS,strlen(ANALYSIS))==0) {
    fprintf(c_idx_fp,"%s - ANALYSIS%*sp%ds%d *%s"
       ,ch,100,"",p_no,story_no,LINE_END);
  }
  else fprintf(c_idx_fp,"%s%*sp%ds%d *%s",ch,100,"",p_no,story_no,LINE_END);
}

// add character to headline index
void add_ch_to_hl_idx(int ch)
{
  // output headline char to buffer and file
```

```
// convert CR to a space as newlines appear in the titles
if (ch==0x0d) {
  fputc(' ',h_idx_fp);
  hl_buf_add(' ');
}
else if (ch==PS_THIN_SP) {
  fputc(' ',h_idx_fp);
}
else {
  fputc(ch,h_idx_fp);
  hl_buf_add(ch);
}
hl_len++;
}

// main convert routine
void convert()
{
int ch;
int in_command=0;
int add_to_index=0;
int add_to_hl_idx=1;
int in_d_quotes=0;

hl_len=0;
hl_buf_end();
// fprintf(h_idx_fp,"%d       ",p_no);
for (;;) {
  ch=fgetc(infile);
  if (ch==EOF) break;
  // detect end of headline
  if ((ch=='`' || hl_len==80) && add_to_hl_idx) {
    fprintf(h_idx_fp,"%*sp%ds%d *%s",100,"",p_no,story_no,LINE_END);
    add_to_hl_idx=0;
    hl_len=0;
  }
  // inside control chars may be a f+b i.e. bold on/off
  // if so we assume this is a company name and add it to the company
  // index
  if (ch==CONTROL) {
    if (in_command) {
      buf_end();
      if (strstr(buf,"f+b")!=NULL) {
        add_to_index=1;
        //fputc('[',outfile);
      }
      else if(strstr(buf,"f-b")!=NULL) {
        add_to_index=0;
        //fputc(']',outfile);
        str_buf_end();
        // append the company to the index
        append_to_index();
      }
    }
    in_command^=1;
```

```
        } else {
          if (in_command) buf_add(ch);
          else {
             switch (ch) {
               case PS_THIN_SP:
                 fprintf(outfile," ");
                 // fputc(MAC_THIN_SP,outfile);
                 // fputc(MAC_THIN_SP,outfile);
                 // fputc(MAC_THIN_SP,outfile);
                 break;
               case '': break;
              default: fputc(ch,outfile); break;
             }
             if (add_to_index) str_buf_add(ch);
             if (add_to_hl_idx) add_ch_to_hl_idx(ch);
          }
        }
      }
    }
  }

//ncmp is the compare routine for qsort
int ncmp(const void *a,const void *b)
{
 char **aa;
 char **bb;
 int p_no_a,p_no_b;
 int s_no_a,s_no_b;
 char *story_pos_a;
 char *story_pos_b;
 aa=(char **)a;
 bb=(char **)b;
 p_no_a=atoi(*aa+1);
 p_no_b=atoi(*bb+1);
 if (p_no_a!=p_no_b) return (p_no_a-p_no_b);
 story_pos_a=strchr(*aa,'S');
 story_pos_b=strchr(*bb,'S');
 s_no_a=atoi(story_pos_a+1);
 s_no_b=atoi(story_pos_b+1);
 return (s_no_a-s_no_b);
} main(int argc, char * *argv)
{
 int i;
 int old_p_no=-1;
 char drive[MAXDRIVE];
 char dir[MAXDIR];
 char file[MAXFILE];
 char ext[MAXEXT];
 char *story_part;

arglst=argv;
 _fmode=O_BINARY;
 // create a company index file
 c_idx_fp=fopen(COMPANY_IDX,"w");
```

```
    if (c_idx_fp==NULL) {
      perror(COMPANY_IDX);
      exit (1);
    }
    // create a headline index file
    h_idx_fp=fopen(HEADLINE_IDX,"w");
    if (h_idx_fp==NULL) {
      perror(HEADLINE_IDX);
      exit (1);
    }
    // sort the input files into page and story order
    qsort((void *)&argv[1],argc-1,sizeof(argv[0]),ncmp);
    for (i=1;i<argc;i++) printf("%s\n",argv[i]);
    for (i=1;i<argc;i++) {
      if ((infile=fopen(argv[i],"r"))==NULL) {
        perror(argv[i]);
        continue;
      }
      fnsplit(argv[i],drive,dir,file,ext);
      printf("[%s]\n",argv[i]);
//      p_no=atoi(&argv[i][4]);
//      story_no=atoi(&argv[i][8]);
      p_no=atoi(&file[1]);
//      story_no=atoi(&file[3]);
      story_part=strchr(file,'S');
      if (story_part!=NULL) story_no=atoi(&story_part[1]);
      else story_no=0;
//      story_no=atoi(&ext[2]);
      // create a temporary output file
      if ((outfile=fopen("tmp.$$$","w"))==NULL) {
        perror("tmp.$$$");
        fclose(infile);
        continue;
      }
     if (p_no!=old_p_no) {
       fprintf(h_idx_fp,"Page %d%s",p_no,LINE_END);
       old_p_no=p_no;
     }
      convert();
      fclose(infile);
      fclose(outfile);
      remove(argv[i]);
      // overwrite original file
      rename("tmp.$$$",argv[i]);
    }
    fclose(c_idx_fp);
    fclose(h_idx_fp);
  }
```

We claim:

1. A computerized method of generating an information display from an input of publication files containing text, graphics, and other data viewable as page images of a publication having text areas and graphics image areas appearing therein, comprising the steps of:

extracting text data from the publication files corresponding to text appearing in respective text areas in predefined locations of the page images of the publication;

processing page image data from the publication files including the text areas in predefined locations corresponding to the page images of the publication;

mapping the predefined locations of the text areas appearing in the page images as respective text area image map data, and indexing each mapped text area to the respective extracted text data corresponding to the text appearing therein;

generating a display on a computer system of page images using the page image data, and linking the text areas of the displayed page images to the corresponding text data using the image map data such that the image-mapped page images have text areas which can be selected by the user pointing at any one of the desired text areas, and generating a simultaneous display of the linked text data corresponding to a text area selected by the user by pointing at the desired text area on the page image side-by-side with the page image, whereby a viewer can read the text in the text passage while referring to the page image for visual cues about the text passage.

2. A computerized method of generating an information display according to claim 1, wherein said mapping step further includes the step of assigning to each mapped text area a page number of the page on which the text area appears and a text area number which corresponds to the relative importance of the text area to other text areas on the page.

3. A computerized method of generating an information display according to claim 2, wherein the text area number is derived based upon any one of the following group of importance indicators: location of the text area on the page; size of type font of a headline associated with the text area; size of type font associated with the text in the text area; and size of text content in the text area.

4. A computerized method of generating an information display according to claim 2, further comprising the steps of: parsing the text data to find predetermined keywords therein, indexing each keyword to a page number and a text area number for the text area in which the keyword is found, and maintaining the indexed keywords on a keyword list from which the corresponding text areas can be located by the keywords.

5. A computerized method of generating an information display according to claim 4, wherein said parsing step is carried out by performing a text string search of the text based upon text string entries contained in a library list of keywords.

6. A computerized method of generating an information display according to claim 4, wherein the display generating step includes displaying a list of keywords indexed in the publication, and displaying a text passage generated from text data which is indexed to a keyword selected from the list of keywords simultaneously with the page image on which the text area corresponding to the text passage appears.

7. A computerized method of generating an information display according to claim 2, wherein the display generating step includes displaying a list of titles ordered by page number and text area numbers for corresponding text areas simultaneously with display of the page image.

8. A computerized method of generating an information display according to claim 1, further comprising the step of mapping graphics image areas for respective graphic images appearing in the page images as image map data, and indexing each mapped graphics image area to a page number of the page on which the graphics image appears and a graphics image area number.

9. A computerized method of generating an information display according to claim 8, wherein the display generating step includes displaying further information linked to a graphics image area simultaneously with the page image in which the graphics image appears.

10. A computerized method of generating an information display according to claim 9, wherein the displayed information is obtained from one of the following group of information sources: a stored graphics image; an output of an externally run process; and stored text.

11. A method of converting digital publication files containing text, graphics, and other data corresponding to page images of a publication having text areas and graphics image areas appearing therein to digital data for generating and controlling a display on a computer system, comprising the steps of:

extracting text data from the publication files corresponding to text appearing in respective text areas in predefined locations of the page images of the publication;

producing page image data including the text areas in predefined locations corresponding to page images of the publication;

mapping the predefined locations of the text areas appearing in the page images of the publication and indexing each text area to the respective extracted text data corresponding to the text in the text area, and maintaining the mapped text areas indexed to the respective extracted text data as display navigation data; and producing a display on a computer system of page images and linking the text areas in the displayed page images to the corresponding text data using said display navigation data such that the image-mapped page images have text areas which can be selected by the user pointing at any one of the desired text areas, and generating a simultaneous display of the linked text data corresponding to a text area selected by the user by pointing at the desired text area on the page image side-by-side with the page image, whereby a viewer can read the text in the text passage while referring to the page image for visual cues about the text passage.

12. A method according to claim 11, wherein said mapping step further includes the step oil assigning to each mapped text area a page number and a text area number which corresponds to the relative importance of the text area to other text areas on the page.

13. A method according to claim 12, wherein the text area number is derived based upon any one of the following group of importance indicators: location of the text area on the page; size of type font of a headline associated with the text area; size of type font associated with the text in the text area; and size of text content in the text area.

14. A method according to claim 11, further comprising the steps of: parsing the text data to find predetermined keywords therein; indexing each keyword to a page number and a text area number for the text area in which the keyword is found; maintaining the indexed keywords on a keyword list from which the corresponding text area can be located; and using said keyword list as display navigation data.

15. A method according to claim 14, wherein said parsing step is carried out by performing a text string search of the text data based upon text string entries contained in a library list of keywords.

16. A method according to claim 11, further comprising the step of mapping graphics image areas for respective graphic images appearing in the page images and indexing each mapped graphics image area to a cage number and a graphics image area number, and maintaining the mapped and indexed graphics image areas as display navigation data.

* * * * *